US008548281B2

(12) United States Patent
Kim et al.

(10) Patent No.: US 8,548,281 B2
(45) Date of Patent: Oct. 1, 2013

(54) ELECTRO-OPTIC MODULATING DEVICE

(75) Inventors: Gyungock Kim, Seoul (KR); Jeong Woo Park, Daejeon (KR); Jongbum You, Seongnam (KR); Sang Gi Kim, Daejeon (KR); Sanghoon Kim, Seoul (KR); In Gyoo Kim, Daejeon (KR); Jiho Joo, Goyang (KR); Duk Jun Kim, Daejeon (KR); Dongwoo Suh, Daejeon (KR); Sahnggi Park, Daejeon (KR); Ki Seok Jang, Daejeon (KR); Junghyung Pyo, Seoul (KR); Kap-Joong Kim, Daejeon (KR); Do Won Kim, Daejeon (KR); Dae Seo Park, Incheon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 263 days.

(21) Appl. No.: 12/872,881

(22) Filed: Aug. 31, 2010

(65) Prior Publication Data

US 2011/0058764 A1    Mar. 10, 2011

(30) Foreign Application Priority Data

Sep. 8, 2009   (KR) ................ 10-2009-0084581
Jul. 12, 2010  (KR) ................ 10-2010-0066675

(51) Int. Cl.
*G02F 1/025*    (2006.01)
(52) U.S. Cl.
USPC ................................ 385/2; 385/3; 385/129
(58) Field of Classification Search
None
See application file for complete search history.

(56) References Cited

U.S. PATENT DOCUMENTS

| | | | | |
|---|---|---|---|---|
| 3,866,143 | A | * | 2/1975 | Jacobs et al. ............... 331/107 R |
| 4,675,518 | A | * | 6/1987 | Oimura et al. ................ 250/205 |
| 4,904,039 | A | * | 2/1990 | Soref ................................. 385/2 |
| 4,997,246 | A | * | 3/1991 | May et al. .......................... 385/2 |
| 5,359,679 | A | | 10/1994 | Tanaka et al. |
| 5,757,986 | A | * | 5/1998 | Crampton et al. ................ 385/2 |
| 5,908,305 | A | | 6/1999 | Crampton et al. |
| 6,298,177 | B1 | * | 10/2001 | House ................................ 385/3 |
| 6,584,239 | B1 | * | 6/2003 | Dawnay et al. .................... 385/2 |
| 7,251,408 | B1 | | 7/2007 | Gunn, III et al. |
| 7,280,712 | B2 | | 10/2007 | Liu |
| 7,474,811 | B1 | * | 1/2009 | Quitoriano et al. ............... 385/2 |
| 7,657,146 | B2 | * | 2/2010 | Laval et al. .................... 385/131 |
| 7,764,850 | B2 | * | 7/2010 | Bratkovski et al. ............... 385/2 |
| 7,826,688 | B1 | * | 11/2010 | Sadagopan et al. ............... 385/2 |
| 8,149,493 | B2 | * | 4/2012 | Chen ............................. 359/250 |
| 8,362,494 | B2 | * | 1/2013 | Lo et al. ........................... 257/79 |
| 2006/0008223 | A1 | | 1/2006 | Gunn, III et al. |
| 2008/0212913 | A1 | | 9/2008 | Gill et al. |
| 2009/0190875 | A1 | * | 7/2009 | Bratkovski et al. ............... 385/2 |

(Continued)

FOREIGN PATENT DOCUMENTS

| | | | |
|---|---|---|---|
| DE | 102004007251 | * | 9/2005 |
| KR | 100772538 B1 | | 10/2007 |

OTHER PUBLICATIONS

D. Marris-Morini et al. Low loss and high speed silicon optical modulator based on a lateral carrier depletion structure. Optics Express, 16:1:334-339, Jan. 2008.*

(Continued)

*Primary Examiner* — Mike Stahl

(57) ABSTRACT

Provided is an electro-optic modulating device. The electro-optic modulating device includes an optical waveguide with a vertical structure and sidewalls of the vertical structure are used to configure a junction.

11 Claims, 26 Drawing Sheets

(56) References Cited

U.S. PATENT DOCUMENTS

| | | | |
|---|---|---|---|
| 2009/0214151 A1* | 8/2009 | Keeling | 385/8 |
| 2009/0263078 A1* | 10/2009 | Hosomi et al. | 385/14 |
| 2010/0080504 A1* | 4/2010 | Shetrit et al. | 385/14 |
| 2010/0099242 A1* | 4/2010 | Fedeli | 438/513 |
| 2010/0158426 A1* | 6/2010 | Manipatruni et al. | 385/2 |
| 2010/0316325 A1* | 12/2010 | Okamoto et al. | 385/3 |
| 2011/0176762 A1* | 7/2011 | Fujikata et al. | 385/2 |
| 2012/0043527 A1* | 2/2012 | Ding et al. | 257/28 |

OTHER PUBLICATIONS

Ansheng Liu et al., "High-speed optical modulation based on carrier depletion in a silicon waveguide", Optics Express, Jan. 22, 2007, pp. 660-668, vol. 15, No. 2, Optical Society of America.

* cited by examiner

ELECTRO-OPTIC MODULATING DEVICE

CROSS-REFERENCE TO RELATED APPLICATIONS

This U.S. non-provisional patent application claims priority under 35 U.S.C. §119 of Korean Patent Application Nos. 10-2009-0084581, filed on Sep. 8, 2009, and 10-2010-0066675, filed on Jul. 12, 2010, the entire contents of which are hereby incorporated by reference.

BACKGROUND OF THE INVENTION

The present invention disclosed herein relates to a photonics device, and more particularly, to an electro-optic modulating device.

Silicon photonics technologies, which are alternative technologies for solving serious heat generation in computing devices and bottlenecks in data communication between semiconductor chips, are becoming an increasingly important issue. The silicon photonics technologies have been significantly developed for the past few years. Examples of the silicon photonics technologies include fast silicon optical modulators, Si—Ge photo-detectors, silicon Raman lasers, silicon optical amplifiers, silicon wavelength converters, and hybrid silicon lasers. Nevertheless, the last data transmission rate that has been realized by silicon modulators is about 10 Gb/s so far. Much faster modulation and data transmission characteristics need to be implemented to meet an increase of a bandwidth that is required for next-generation communication networks and future high-performance computing devices.

Most commercialized high-speed optical modulators are based on electro-optic materials such as lithium niobate and group III-V semiconductors, and are known to provide modulation characteristics of about 40 Gb/s (much faster than 10 Gb/s). In contrast, since single crystal silicon is a material without linear electro-optical characteristics (i.e., Pockels effect) and takes very weak Franz-Keldysh effect, it is difficult to implement fast modulation characteristics in silicon.

Although strained silicon was known to take the Pockels effect in recent years, its measured electro-optic coefficient is much smaller than that of $LiNbO_3$. Also, even though strained Ge/SiGe quantum well structures was known to have relatively high electro-optic absorption characteristics because of the Quantum Confined Stark Effect, various technical limitations (e.g., strain engineering) must be solved in order to implement the strained Ge/SiGe quantum well structures.

As known so far, the high-speed modulation in silicon may be implemented only through the free carrier plasma dispersion effect. In silicon, a variation of the free carrier density incurs a variation of the refractive index of material, and thus the modulation rate of a silicon modulator based on the free carrier plasma dispersion effect is determined by how quickly the free carriers can be injected or removed. Device configuration proposed to implement phase modulation in silicon is roughly divided into three types of forward biased p-i-n diodes, MOS capacitors, and reverse biased PN-junctions.

The forward biased p-i-n diode manner disclosed in U.S. Pat. No. 5,908,305 has been proven to provide high modulation efficiency. However, because of slow charge generation process and slow recombination process, the forward biased p-i-n diode manner has a limitation in the modulation rate unless the lifespan of charges is dramatically reduced.

Both of the MOS capacitor and the reverse biased PN-junction are potentially based on the electric-field induced majority carrier dynamics that may realize about 10 Gb/s or more. However, these manners require a long phase-modulator due to low modulation efficiency. In addition, the reverse biased PN-junction manner disclosed in U.S. Pat. Pub. No. 2006/0008223 has a technical limitation in that optical waveguide loss is large because the entire region of an optical waveguide for phase-modulation is very heavily doped.

SUMMARY OF THE INVENTION

The present invention provides a high-performance electro-optic modulating device providing the characteristics such as high-speed, high modulation efficiency, miniaturization, low power consumption, and low optical waveguide loss.

Embodiments of the present invention provide electro-optic modulating devices including an optical waveguide where a vertical structure with at least two sidewalls is disposed, where the sidewalls are used to configure a junction.

In some embodiments, the thickness of the optical waveguide may be smaller than the sum of the lengths of the sidewalls of the vertical structure, projected on a plane vertical to a travelling direction of the optical waveguide.

In other embodiments, the optical waveguide may include a slab waveguide structure including a first slab portion, a second slab portion, and a rib portion disposed between the first slab portion and the second slab portion, and the vertical structure is disposed in the rib portion.

In still other embodiments, the optical waveguide may include: a first body region extended from the first slab portion to contact one sidewall of the vertical structure and a second body region extended from the second slab portion to contact the other sidewall of the vertical structure, where the first and second body regions are first conductive types, and the vertical structure includes at least one vertical doping region having a second conductive type different from the first conductive type.

In even other embodiments, the first and second body regions, and the vertical structure may form a pair of PN-junctions, the vertical structure having a vertical length larger than the thickness of the first slab portion and smaller than the half of the sum of the length of the PN junctions projected on a plane vertical to a travelling direction of the optical waveguide.

In yet other embodiments, the electro-optic modulating devices may further include: a first interconnection structure electrically connecting the vertical doping region and a first circuit; and a second interconnection structure electrically connecting the slab portion and a second circuit, where the first and the second circuits are configured to generate an electric potential difference for a reverse-bias operation of the PN junctions.

In further embodiments, the first slab portion may include a first doping region of a first conductive type, the second slab portion may include a second doping region of the first conductive type, the optical waveguide may include: a first body region extended from the first doping region to contact one sidewall of the vertical structure; and a second body region extended from the second doping region to contact the other sidewall of the vertical structure, the first and second body regions may be formed of intrinsic semiconductors, and the vertical structure may include at least one vertical doping region having a second conductive type different from the first conductive type.

In still further embodiments, the first doping region, the first body region and the vertical structure may form a PIN junction, and the second doping region, the second body region and the vertical structure may form a PIN junction.

In even further embodiments, the electro-optic modulating devices may further include: a first interconnection structure electrically connecting the vertical doping region and a first circuit: and a second interconnection structure electrically connecting the slab portion and a second circuit, where the first and second circuits are configured to generate an electric potential difference for a forward-bias operation of the PIN junctions.

In yet further embodiments, the first and second doping regions may have the substantially same thicknesses as the first and second slab portions, respectively.

In much further embodiments, the vertical structure may include: a plurality of vertical doping regions: and at least one internal region disposed between the vertical doing regions.

In still much further embodiments, the at least one internal region may include an internal doping region having a conductive type different from those of the vertical doping regions, to form a PN-junction along with the vertical doping regions.

In even much further embodiments, the at least one internal region may include a pair of intrinsic regions and an internal doping region disposed between the pair of intrinsic regions and having a conductive type different from those of the vertical doping regions, to form at least two PIN-junctions along with the vertical doping regions.

In yet much further embodiments, the optical waveguide may include a first slab portion, a second slab portion, and a rib portion disposed between the first and second slab portions, the first and second slab portions including first and second doping regions of a first conductive type, and the internal region and the first and second doping regions may be electrically connected to circuits generating different voltages.

In yet much further embodiments, the optical waveguide may include a first slab portion, a second slab portion, and a rib portion disposed between the first and second slab portions, the first and second slab portions including first and second doping regions of a first conductive type, and the internal region and the first and second doping regions may be electrically connected to each other to be in an equipotential state.

In yet much further embodiments, the first slab portion may include a first doping region of a first conductive type, and the second slab portion may include a second doping region of a second conductive type different from the first conductive type. The vertical structure may include: a first vertical doping region having the second conductive type and disposed adjacent to the first slab portion; and a second vertical doping region having the first conductive type and disposed adjacent to the second slab portion.

In yet much further embodiments, the electro-optic modulating devices may further include a buried insulating layer disposed under the optical waveguide, where the optical waveguide is formed to have a sidewall exposing an upper surface of the buried insulating layer.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

In the specification, the dimensions of layers and regions are exaggerated for clarity of illustration. It will also be understood that when a layer (or film) is referred to as being 'on' another layer or substrate, it can be directly on the other layer or substrate, or intervening layers may also be present. Also, though terms like a first, a second, and a third are used to describe various regions and layers in various embodiments of the present invention, the regions and the layers are not limited to these terms. These terms are used only to tell one region or layer from another region or layer. Therefore, a layer referred to as a first layer in one embodiment can be referred to as a second layer in another embodiment. An embodiment described and exemplified herein includes a complementary embodiment thereof.

Hereinafter, it will be described about an exemplary embodiment of the present invention in conjunction with the accompanying drawings.

Embodiment 1

Figure 1A:
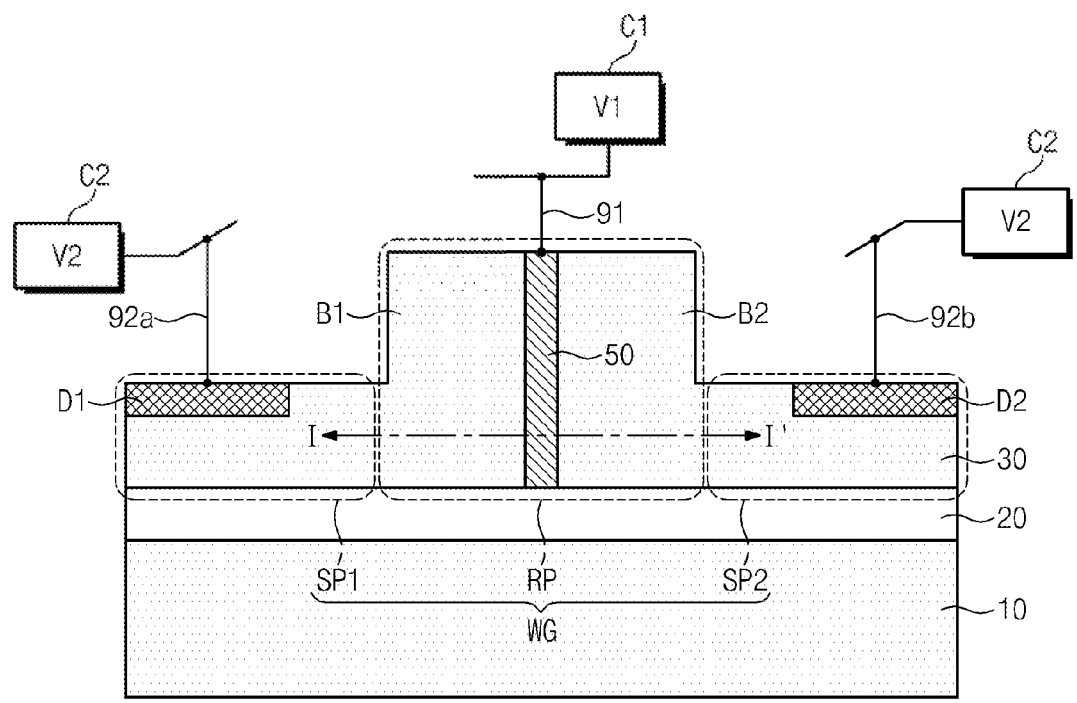
FIGS. 1A and 1B are cross-sectional diagrams illustrating electro-optic modulating devices according to a first embodiment of the present invention.
Figure 1B:
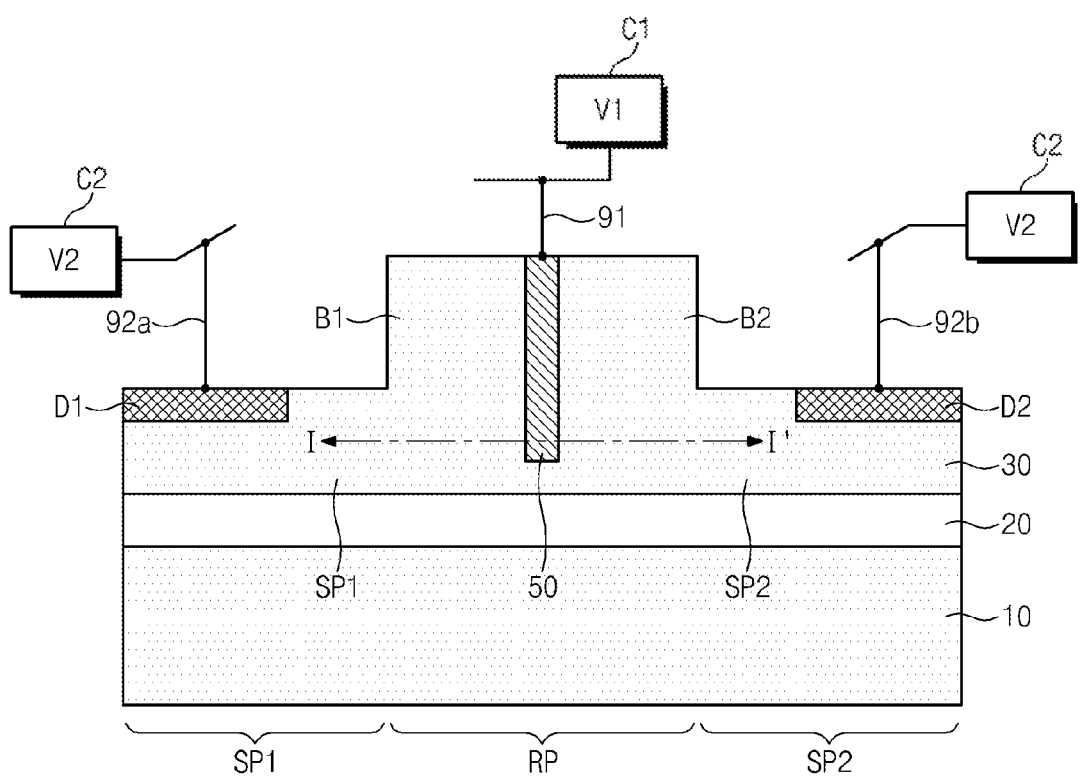
Figure 1C:
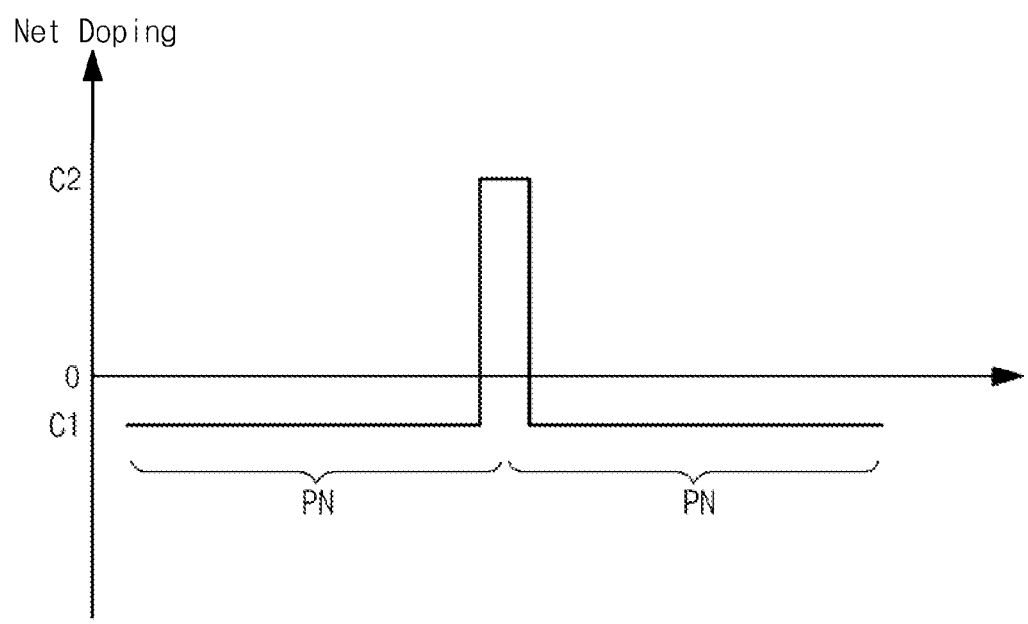
FIG. 1C is a graph illustrating a net doping profile of an electro-optic modulating device according to a first embodiment of the present invention.

FIGS. 1A and 1B are cross-sectional diagrams illustrating electro-optic modulating devices according to a first embodiment of the present invention. FIG. 1C is a graph illustrating a net doping profile of an electro-optic modulating device according to a first embodiment of the present invention. Specifically, FIG. 1C is a graph illustrating a net doping profile shown along the dotted lines I-I' of FIGS. 1A and 1B.

Referring to FIGS. 1A and 1B, a semiconductor layer 30 forming an optical waveguide WG may be disposed over a substrate 10. The optical waveguide WG may be a slab optical waveguide structure including a first slab portion SP1, a second slab portion SP2, and a rib portion RP disposed therebetween. The rib portion RP may be formed to have a thickness greater than the first or second slab SP1 and SP2.

According to an embodiment of the present invention, the semiconductor layer 30 may be formed of single crystal silicon. For example, the semiconductor layer 30 may form a SOI wafer along with the substrate 10. In this case, a buried insulating layer 20 may be disposed between the substrate and the semiconductor layer 30 as shown in FIGS. 1A and 1B. The buried insulating layer 20 may be formed of an insulating material (e.g., silicon oxide) having a refractive index lower than that of the semiconductor layer 30 to be used as a clad layer of an optical waveguide. However, embodiments of the present invention are not limited to the above wafer structure or types of thin layers.

First and second doping regions D1 and D2 may be disposed in the first and second slab portions SP1 and SP2, respectively. A vertical doping region 50 may be disposed in the rib portion RP to form a vertical structure. According to the present embodiment, the first and second doping regions D1 and D2 are first conductive types, and the vertical doping region 50 may be a second conductive type different from the first conductive type. For example, when the first and second doping regions D1 and D2 are p-types, the vertical doping region 50 may be an n-type. Alternatively, when the first and second doping regions D1 and D2 are n-types, the vertical doping region 50 may be a p-type.

According to the present embodiment, a portion (hereinafter, a first body region B1) of the optical waveguide WG disposed between the first doping region D1 and the vertical doping region 50 may be the same conductive type as the first doping region D1. That is, the first body region B1 may be doped with a conductive type different from that of the vertical doping region 50. Thus, the first body region D1 and the vertical doping region 50 may form a PN-junction as shown in FIG. 1C. Similarly, the other portion (hereinafter, a second body region B2) of the optical waveguide WG disposed between the second doping region D2 and the vertical doping region 50 may be doped with a conductive type different from that of the vertical doping region 50 to allow the second body region B2 and the vertical doping region 50.

Referring to FIG. 1A, the vertical doping region 50 may be disposed to allow the undersurface thereof to contact the upper surface of the buried insulating layer 20. That is, the vertical doping region 50 may have the substantially same thickness as the rib portion RP. In this case, the first body region B1 and the second body region B2 may be separated from each other by the vertical doping region 50 as shown in FIG. 1A. Also, the vertical doping region 50 may be used as a common electrode of two PN-junctions defined by the first and second body regions B1 and B2. According to another embodiment of the present invention, the first body region B1, the vertical doping region 50, and the second body region B2 may form a Bipolar Junction Transistor (BJT). In this case, the first doping region D1 and the second doping region D2 may be connected to different circuits generating different voltages unlike in FIG. 1A.

Referring to FIG. 1B, the thickness of the vertical doping region 50 may be smaller than the thickness of the rib portion RP. In this case, the first body region B1 may be connected to the second region B2 under the vertical doping region 50. That is, the PN-junctions formed by the first and second body regions B1 and B2 may be connected to each other under the vertical doping region 50. In this case, the length of the connected PN-junctions (projected on a certain plane crossing a travelling direction of the rib portion RP) may be about twice longer than the length of the vertical doping region 50.

In the meantime, FIGS. 1A and 1B are cross-sectional diagrams illustrating sections of an electro-optic modulating device projected on one of planes crossing a travelling direction of the optical waveguide, and are not provided to show the electro-optic modulating device according to the embodiment of the present invention has the illustrated structure throughout the optical waveguide. That is, the electro-optic modulating device according to the embodiment of the present invention may include a portion like a sectional structure shown in the drawings, but all portions thereof need not be formed like the sectional structure illustrated in the drawing. For example, at a portion of the optical waveguide WG, the first body region B1 may have a portion directly contacting the second body region B2.

In addition, the first and second doping regions D1 and D2 have the same conductive type as the first and second body regions B1 and B2, and may be more heavily doped than the first and second body regions B1 and B2. Also, as shown in FIG. 1C, the vertical doping region 50 may have a conductive type different from the first and second body regions B1 and B2, and may be more heavily doped than the first and second body regions B1 and B2. Although an abrupt junction structure is shown in FIG. 1C as an example, the concentration profiles of each of the vertical doping region 50 and the first and second body regions B1 and B2 may be variously modified. For example, the PN-junctions may also be implemented in a linearly graded junction structure.

According to the present embodiment, the vertical doping region 50 may be electrically connected to a first circuit C1 generating a first voltage V1 through a first interconnection structure 91, and the first and second doping regions D1 and D2 may be electrically connected to a second circuit C2 generating a second voltage V2 through second interconnection structures 92a and 92b.

According to an embodiment, the first voltage V1 and the second voltage V2 may be a modulation voltage and a ground voltage, respectively. Thus, a certain electric potential difference determined by the first voltage V1 may be generated between the vertical doping region 50 and the first and second body regions B1 and B2. As described above, since both sidewalls of the vertical doping region 50 are used to form PN-junctions, the electro-optic modulating device according to the embodiment described with reference to FIGS. 1A and 1B may cause a variation of an increased effective refractive index compared to methods proposed by typical technologies. For example, the electro-optic modulating device according to the present embodiment may cause a double variation of the effective refractive index compared to a method disclosed U.S. Pat. Pub. No. 2006/0008223. This increase of the variation of the effective refractive index may make it possible to obtain an increased phase shift or make it possible to form a shorter length of a modulation region in an optical waveguide. In particular, when the PN-junctions operate in a PN reverse mode, it is possible to reduce a technical limitation of heavily doping an active region of the optical waveguide. That is, according to the present embodiment, since it is possible to reduce an average doping level of the optical waveguide, the optical loss can be reduced in the optical waveguide WG.

First Modified Embodiment

Figure 2A:
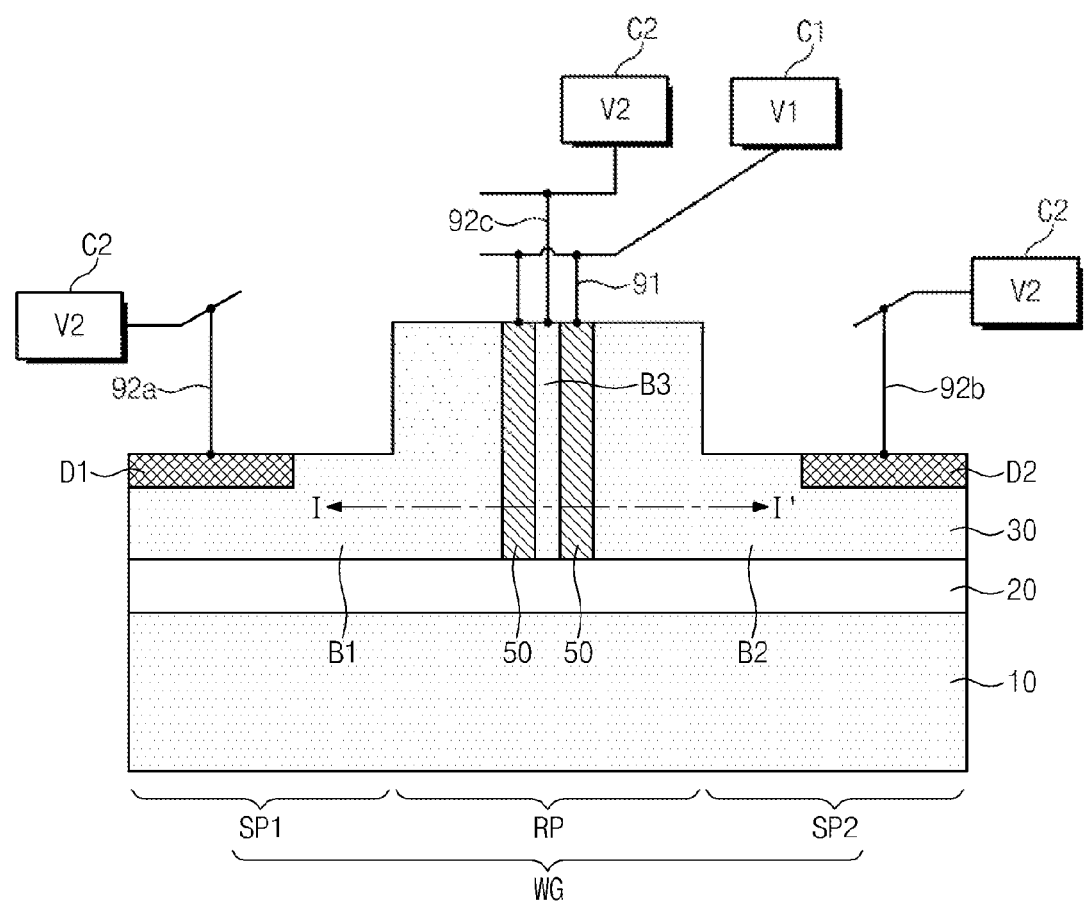
FIGS. 2A and 2B are cross-sectional diagrams illustrating electro-optic modulating devices according to a first modified embodiment of the present invention.
Figure 2B:
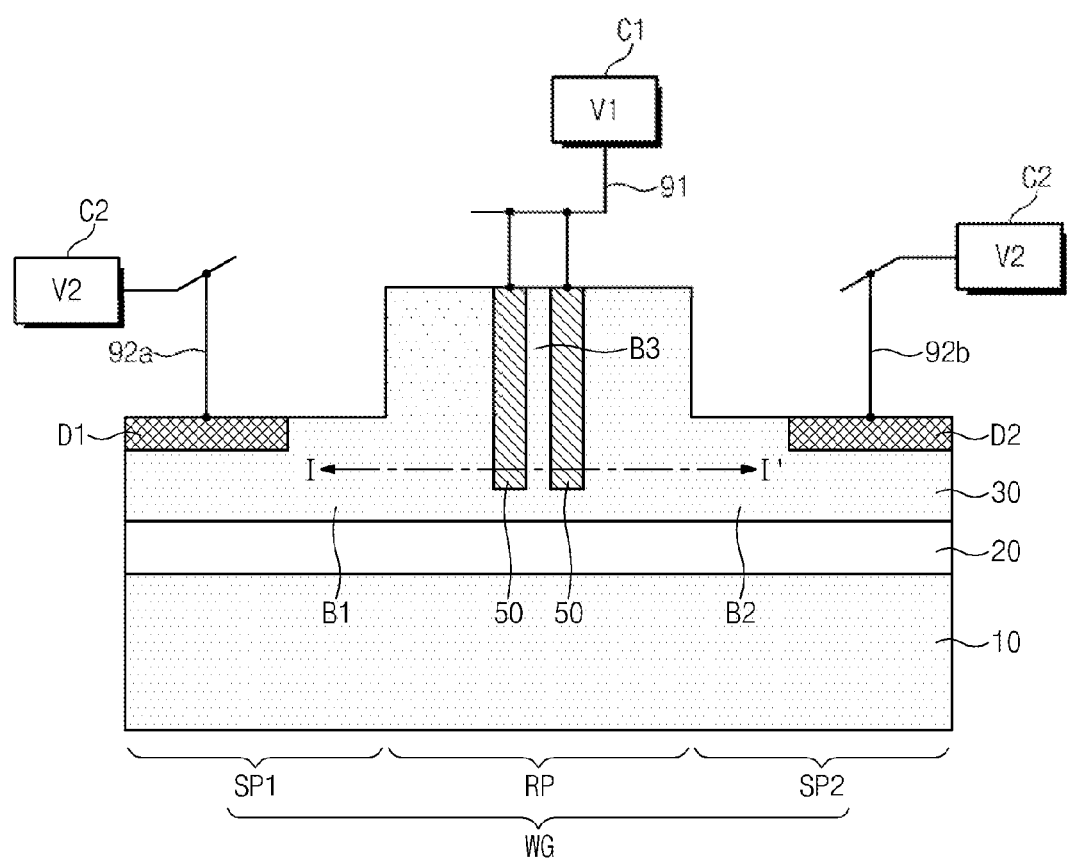
Figure 2C:
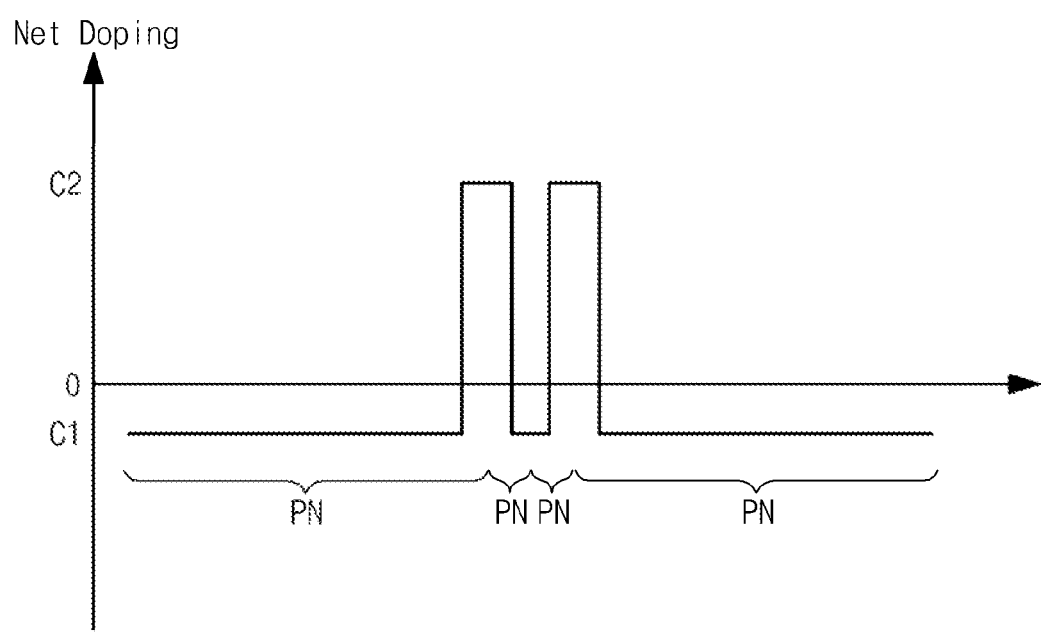
FIG. 2C is a graph illustrating a net doping profile of an electro-optic modulating device according to a first modified embodiment of the present invention.

FIGS. 2A and 2B are cross-sectional diagrams illustrating electro-optic modulating devices according to a first modified embodiment of the present invention. FIG. 2C is a graph illustrating a net doping profile of an electro-optic modulating device according to a first modified embodiment of the present invention. Specifically, FIG. 2C is a graph illustrating a net doping profile along dotted lines I-I' of FIGS. 2A and 2B. For simplicity of explanation, description of technical features identical to those of the embodiments described with reference to FIGS. 1A through 1C will be omitted herein.

Referring to FIGS. 2A and 2B, a vertical structure including two vertical doping regions 50 may be disposed in the rib portion RP. In addition, the vertical structure may further include an internal doping region B3 disposed between the vertical doping regions 50.

The internal doping region B3 may be the same conductive type as the first and second body regions B1 and B2, and the vertical doping regions 50 may be conductive types different from the first and second body regions B1 and B2. Thus, PN-junctions having a longer length than that of embodiment described with reference to FIGS. 1A through 1C may be disposed in the rib portion RP. For example, as shown in FIG. 2A, the vertical doping region 50 may be disposed to contact the upper surface of the buried insulating layer 20 to be used as common electrodes of the two separated PN-junctions, respectively. That is, according to the embodiment of FIG. 2A, four PN-junctions may be formed in the rib portion RP as shown in FIG. 2C. Also, as shown in FIG. 2B, the vertical doping regions 50 may be more thinly formed than the thickness of the rib portion RP to allow all of the side surfaces and lower surfaces of the vertical doping regions 50 to form PN-junctions. Thus, the length of the PN-junction of an optical device according to the embodiment of FIG. 2B may be about twice greater than that of an optical device according to the embodiment of FIG. 1B.

Meanwhile, as shown in FIGS. 2A and 2B, the vertical doping regions 50 may be electrically connected to a first circuit C1 generating a first voltage V1 through a first interconnection structure 91. According to an embodiment, as shown in FIG. 2A, the internal doping region B1 may be connected to a second circuit C2 generating a second voltage V2 through an internal interconnection structure 92c. According to another embodiment as shown in FIG. 2B, the internal doping region B3 may be electrically connected to the first and second body regions B1 and B2 under the vertical doping regions 50, and thereby may be in the equipotential state as the first and second body regions B1 and B2 without a separate interconnection.

Upon operation, the first voltage V1 and the second voltage V2 may be a modulation voltage and a ground voltage, respectively. Thus, a certain electric potential difference determined by the first voltage V1 may be generated between the vertical doping regions 50 and the first and second body regions B1 and B2. According to an embodiment, the first voltage V1 and the second voltage V2 may be selected to allow the PN-junctions to operate in a PN reverse mode.

Second Modified Embodiment

Figure 3A:
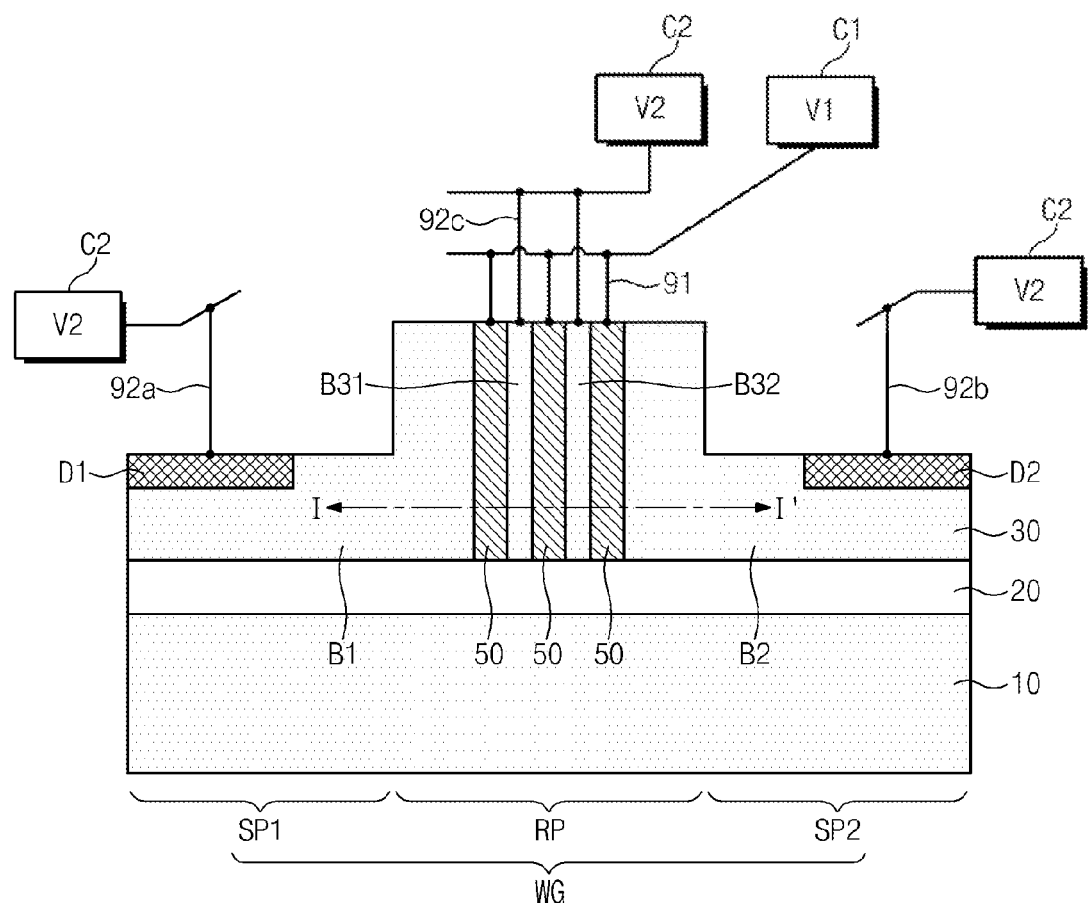
FIGS. 3A and 3B are cross-sectional diagrams illustrating electro-optic modulating devices according to a second modified embodiment of the present invention.
Figure 3B:
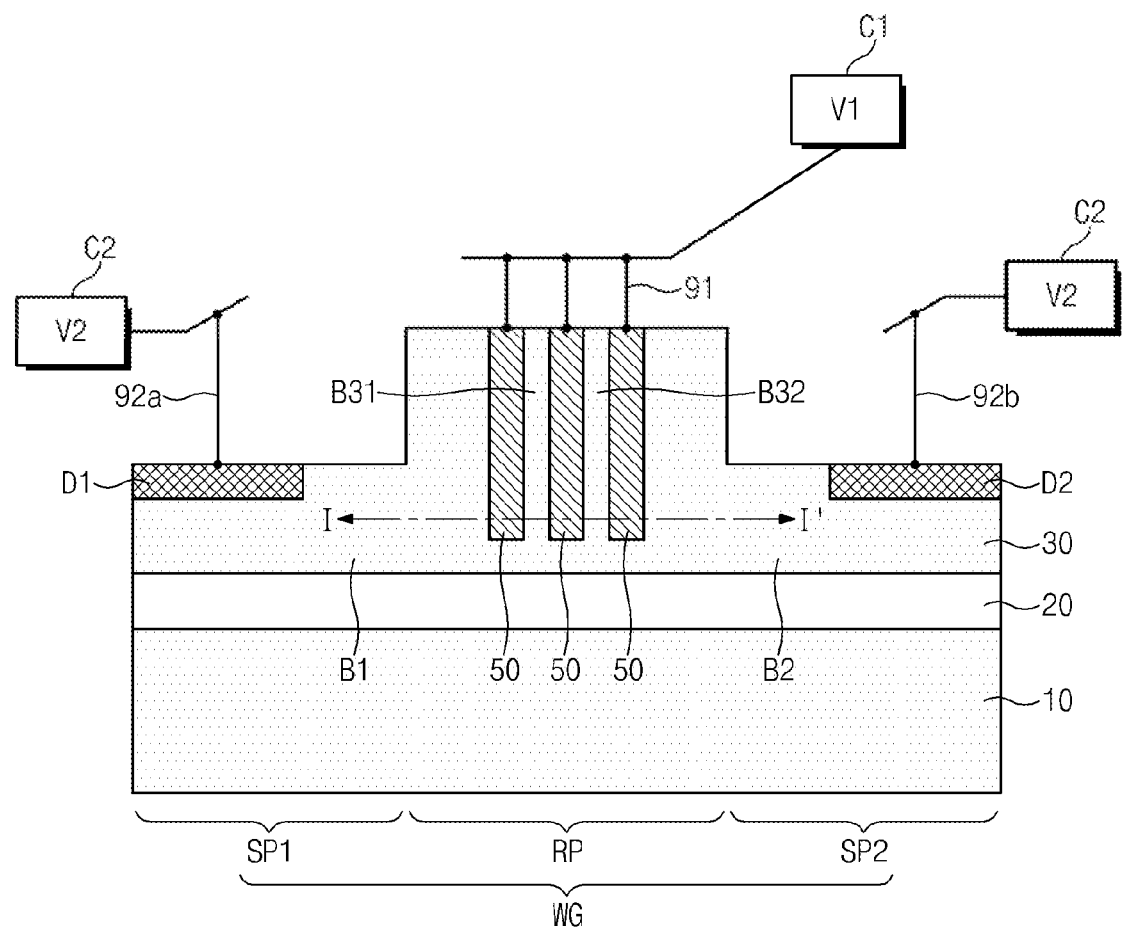
Figure 3C:
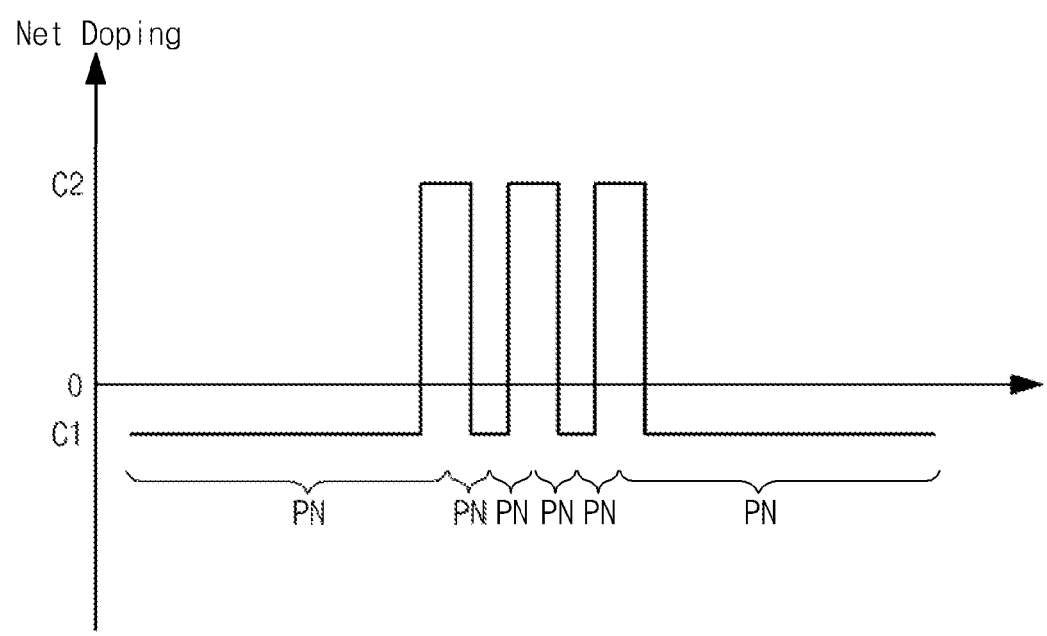
FIG. 3C is a graph illustrating a net doping profile of an electro-optic modulating device according to a second modified embodiment of the present invention.

FIGS. 3A and 3B are cross-sectional diagrams illustrating electro-optic modulating devices according to a second modified embodiment of the present invention. FIG. 3C is a graph illustrating a net doping profile of an electro-optic modulating device according to a second modified embodiment of the present invention. Specifically, FIG. 3C is a graph illustrating a net doping profile along dotted lines I-I' of FIGS. 3A and 3B. For simplicity of explanation, description of technical features identical to those of the embodiments described with reference to FIGS. 1A through 1C will be omitted herein.

Referring to FIGS. 3A and 3B, a vertical structure including three vertical doping regions 50 may be disposed in the rib portion RP. In addition, the vertical structure may further include two internal doping regions B31 and B32 disposed among the vertical doping regions 50.

The internal doping regions B31 and B32 may be the same conductive types as the first and second body regions B1 and B2, and the vertical doping regions 50 may be conductive types different from the first and second body regions B1 and B2. Thus, PN-junctions having a longer length than that of embodiment described with reference to FIGS. 2A through 2C may be disposed in the rib portion RP. For example, as shown in FIG. 2A, the vertical doping region 50 may be disposed to contact the upper surface of the buried insulating layer 20 to be used as common electrodes of the two separated PN-junctions, respectively. That is, according to the embodiment of FIG. 3A, six PN-junctions may be formed in the rib portion RP as shown in FIG. 3C. Also, as shown in FIG. 3B, the vertical doping regions 50 may be more thinly formed than the thickness of the rib portion RP to allow all of the side surfaces and lower surfaces of the vertical doping regions 50 to form PN-junctions. Thus, the length of the PN junction of an optical device according to the embodiment of FIG. 3B may be about three times greater than that of an optical device according to the embodiment of FIG. 1B.

In the meantime, as shown in FIGS. 2A and 2B, the vertical doping regions 50 may be electrically connected to a first circuit C1 generating a first voltage V1 through a first interconnection structure 91. According to an embodiment as shown in FIG. 2A, the internal doping regions B31 and B32 may be connected to a second circuit C2 generating a second voltage V2 through an internal interconnection structure 92c. According to another embodiment as shown in FIG. 2B, the internal doping regions B31 and B32 may be electrically connected to the first and second body regions B1 and B2 under the vertical doping regions 50, and thereby may be in equipotential state as the first and second body regions B1 and B2 without a separate interconnection.

Upon operation, the first voltage V1 and the second voltage V2 may be a modulation voltage and a ground voltage, respectively. Thus, a certain electric potential difference determined by the first voltage V1 may be generated between the vertical doping regions 50 and the first and second body regions B1 and B2. According to an embodiment, the first voltage V1 and the second voltage V2 may be selected to allow the PN-junctions to operate in a PN reverse mode.

Second Embodiment

Figure 4A:
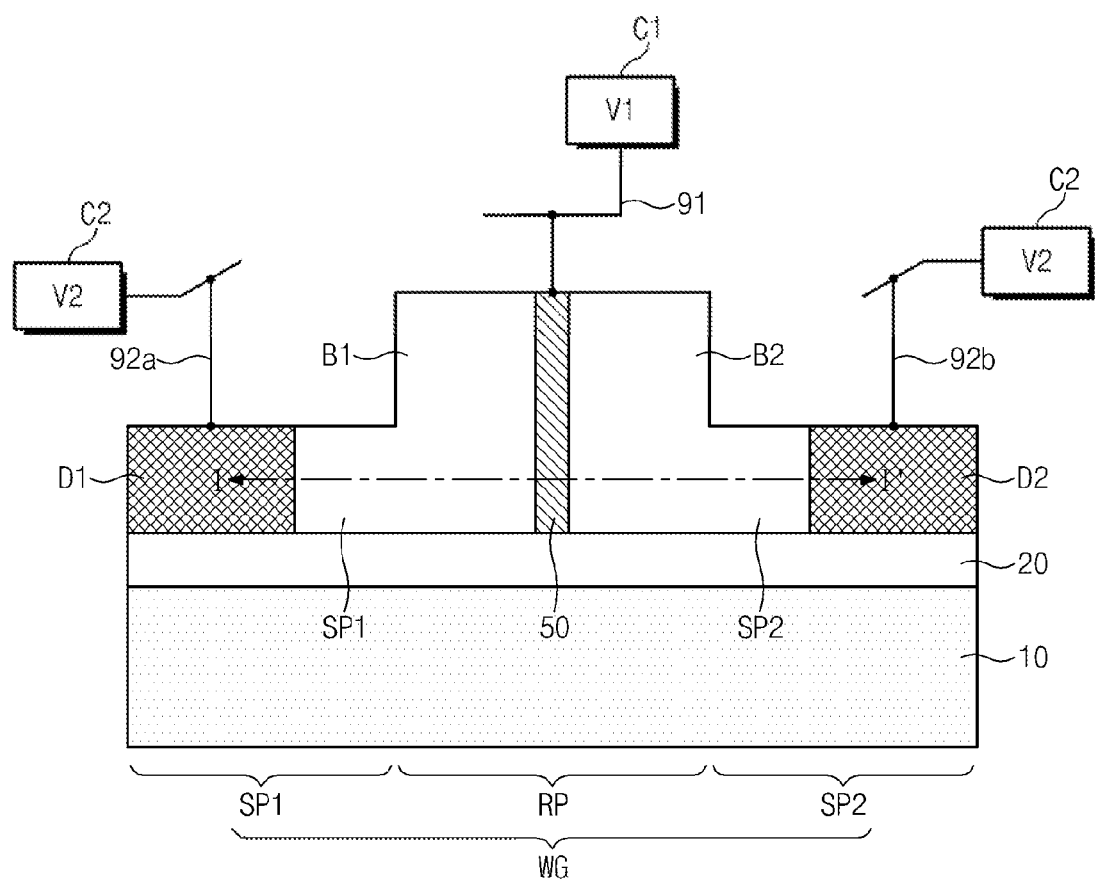
FIG. 4A a cross-section diagram illustrating an electro-optic modulating device according to a second embodiment of the present invention.
Figure 4B:
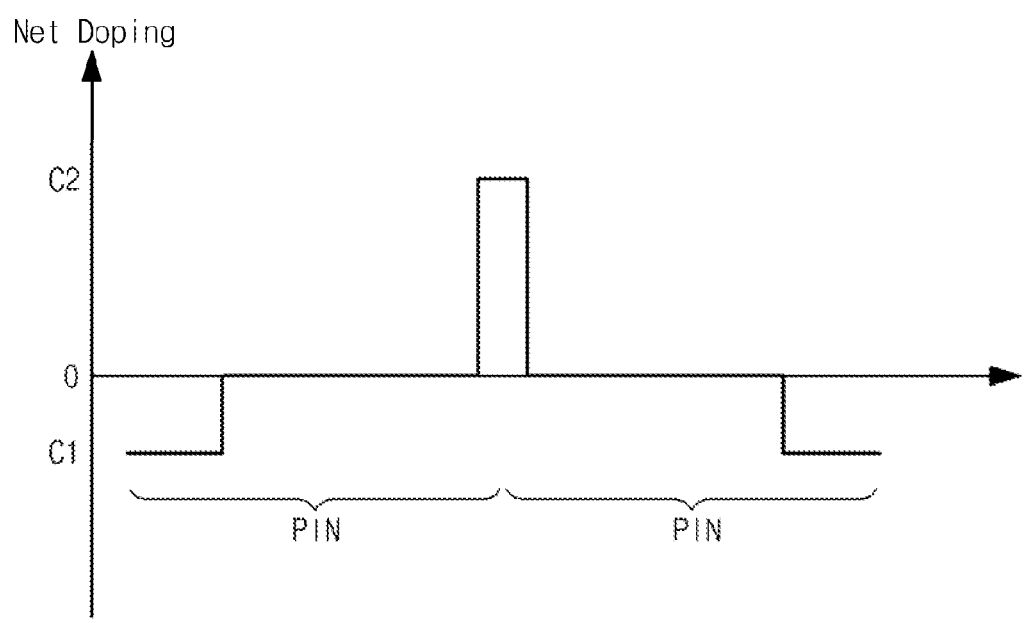
FIG. 4B is a graph illustrating a net doping profile of an electro-optic modulating device according to a second embodiment of the present invention.

FIG. 4A a cross-section diagram illustrating an electro-optic modulating device according to a second embodiment of the present invention. FIG. 4B is a graph illustrating a net doping profile of an electro-optic modulating device according to a second embodiment of the present invention. Specifically, FIG. 4B is a graph illustrating a net doping profile along the dotted line I-I' of FIG. 4A. For simplicity of explanation, description of technical features identical to those of the embodiments described with reference to FIGS. 1A through 1C will be omitted herein.

Referring to FIG. 4A, a semiconductor layer 30 forming an optical waveguide WG may be disposed over a substrate 10. The optical waveguide WG may include a first slab portion SP1, a second slab portion SP2, and a rib portion RP disposed therebetween.

First and second doping regions D1 and D2 may be disposed in the first and second slab portions SP1 and SP2. A vertical doping region 50 forming a vertical structure may be disposed in the rib portion RP. According to the present embodiment, the first and second doping regions D1 and D2 are first conductive types, and the vertical doping region 50 may be a second conductive type different from the first conductive type. For example, when the first and second doping regions D1 and D2 are p-types, the vertical doping region 50 may be an n-type.

According to the present embodiment, a portion (hereinafter, first body region B1) of the optical waveguide WG disposed between the first doping region D1 and the vertical doping region 50 may substantially have physical properties close to an intrinsic semiconductor. For example, the first body region B1 may be undoped silicon or silicon having a lower doping level by several orders than the first doping region D1. Thus, the first doping region D1, the first body region B1, and the vertical doping region 50 may form a PIN junction as shown in FIG. 4B. Similarly, another portion (hereinafter, second body region B2) of the optical waveguide WG disposed between the second doping region D2 and the vertical doping region 50 may substantially have physical properties close to an intrinsic semiconductor, thereby allowing the second doping region D2, the second body region B2, and the vertical doping region 50 to form a PIN-junction.

In addition, the vertical doping region 50 may be formed to allow the undersurface of the vertical doping region 50 to contact the upper surface of the buried insulating layer 20. That is, the vertical doping region 50 may have the substantially same thickness as the rib portion RP. In this case, the first body region B1 and the second body region B2 may be separated from each other by the vertical doping region 50 as shown in FIG. 1A such that two PIN-junctions may be formed in one rib portion RP. Also, the vertical doping region 50 may be used as a common electrode of the two PN-junctions defined by the first and second body regions B1 and B2.

In the meantime, FIG. 4A is a cross-sectional diagram illustrating sections of an electro-optic modulating device projected on one of planes crossing a travelling direction of the optical waveguide, and are not provided to show the electro-optic modulating device according to the embodiment of the present invention has the illustrated structure throughout the optical waveguide WG. That is, the electro-optic modulating device according to the embodiment of the present invention may include a portion like a sectional structure shown in the drawing, but all portions thereof need not be formed like the sectional structure illustrated in the drawing. For example, at a portion of the optical waveguide WG that is not used as a modulation region of the optical waveguide WG, the vertical doping region 50 may not be disposed such that the first body region B1 may directly contact the second body region B2.

According to the present embodiment, the first and second doping regions D1 and D2 may be formed to have the undersurface contacting the upper surface of the buried insulating layer 20. That is, the first and second doping regions D1 and D2 may have the substantially same thicknesses as the first and second slab portions SP1 and SP2. Also, although an abrupt junction structure is shown in FIG. 4B as an example, the concentration profiles of each portion of the PIN-junction may be variously modified from those shown in the drawing.

The vertical doping region 50 may be electrically connected to a first circuit C1 generating a first voltage V1 through a first interconnection structure 91, and the first and second doping regions D1 and D2 may be electrically connected to a second circuit C2 generating a second voltage V2 through second interconnection structures 92a and 92b.

According to an embodiment, the first voltage V1 and the second voltage V2 may be a modulation voltage and a ground voltage, respectively. Thus, a certain electric potential difference dependent on the first voltage V1 may be generated between the vertical doping region 50 and the first and second body regions B1 and B2. As described above, since both sidewalls of the vertical doping region 50 are used to form PIN-junctions, the electro-optic modulating device according to the embodiment described with reference to FIG. 4A may cause a variation of an increased effective refractive index compared to methods proposed by typical technologies. This increase of the variation of the effective refractive index may make it possible to obtain an increased phase shift or make it possible to form a shorter length of a modulation region in an optical waveguide. In particular, when the first and second voltages V1 and V2 are generated such that the PIN-junctions operate in a PIN forward mode, the size of a current entering the optical waveguide may increase two times compared to typical technologies. That is, the electro-optic modulating device according to the present embodiment makes it possible to implement a more efficient phase shift with a lower modulation voltage than that in typical technologies. In addition, when the width of the vertical doping region 50 is maintained at a certain site or less, optical loss that may be caused by the heavily-doped vertical doping region 50 may be restrained.

Third Modified Embodiment

Figure 5A:
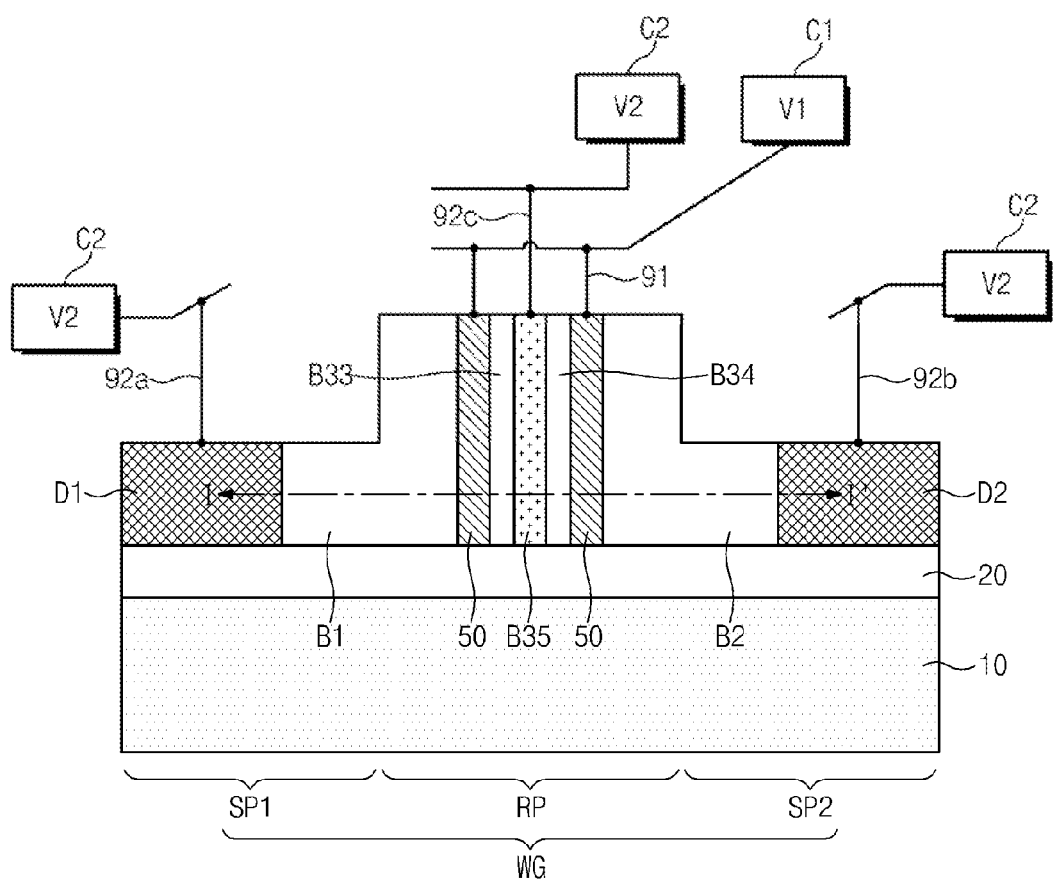
FIG. 5A is a cross-sectional diagram illustrating an electro-optic modulating device according to a third modified embodiment of the present invention.
Figure 5B:
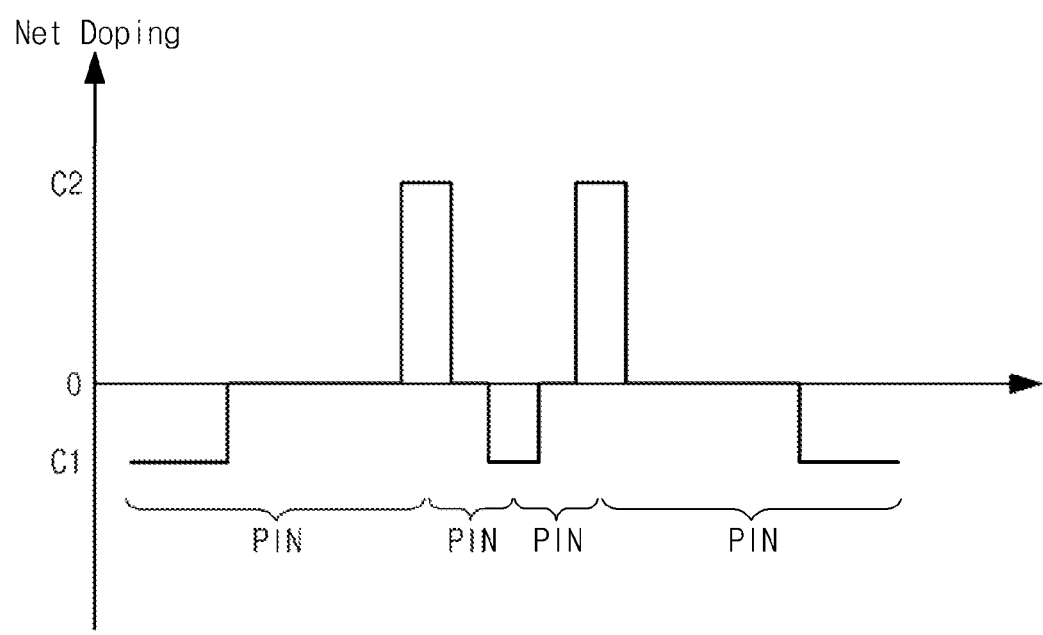
FIG. 5B is a graph illustrating a net doping profile of an electro-optic modulating device according to a third modified embodiment of the present invention.

FIG. 5A is a cross-sectional diagram illustrating an electro-optic modulating device according to a third modified embodiment of the present invention. FIG. 5B is a graph illustrating a net doping profile of an electro-optic modulating device according to a third modified embodiment of the present invention. Specifically, FIG. 5B is a graph illustrating a net doping profile along the dotted line I-I' of FIG. 5A. For simplicity of explanation, description of technical features identical to those of the embodiments described with reference to FIGS. 4A and 4B will be omitted herein.

Referring to FIG. 5A, a vertical structure including two vertical doping regions 50 may be disposed in the rib portion RP. In addition, the vertical structure may further include a pair of intrinsic regions B33 and B34 disposed between the vertical doping regions 50, and an internal doping region B35 disposed between the intrinsic regions B33 and B34.

Similarly to the first and second body region B1 and B2 the intrinsic regions B33 and B34 may have physical properties close to an intrinsic semiconductor. However, the intrinsic regions B33 and B34 need not have the exact same physical properties as the first and second body regions B1 and B2.

The internal doping region B35 may have the same conductive type as the first and second doping regions D1 and D2. That is, the internal doping region B35 may have a conductive type different from the vertical doping regions 50, and therefore a pair of PIN-junctions may be formed in the vertical structure as shown in FIG. 5B. As a result, the optical waveguide WG may include four PIN-junctions, using the first and second body regions B1 and B2, and the first and second intrinsic regions B33 and B34 as intrinsic semiconductor, respectively. Thus, the present embodiment may include PIN-junctions having a more increased length than that of the embodiment described with reference to FIG. 4A.

In the meantime, as shown in FIG. 5A, the vertical doping regions 50 may be electrically connected to the first circuit C1 generating a first voltage V1 through a first interconnection structure 91, and the internal doping region B35 may be electrically connected to a second circuit C2 generating a second voltage V2 through an internal interconnection structure 92c.

According to an embodiment, the first voltage V1 and the second voltage V2 may be a modulation voltage and a ground voltage, respectively. Thus, a certain electric potential difference dependent on the first voltage V1 may be generated between the vertical doping region 50 and the first and second body regions B1 and B2, In particular, when the first and second voltages V1 and V2 are generated such that the PIN-junctions operate in a PIN forward mode, the size of a current entering the optical waveguide may further increase compared to typical technologies or the embodiment described with reference to FIG. 4A. Similarly to the above embodiments, when the width of the vertical doping regions 50 is maintained at a certain size or less, optical loss that may be caused by the heavily-doped vertical doping region 50 may be restrained.

Fourth Modified Embodiment

Figure 6A:
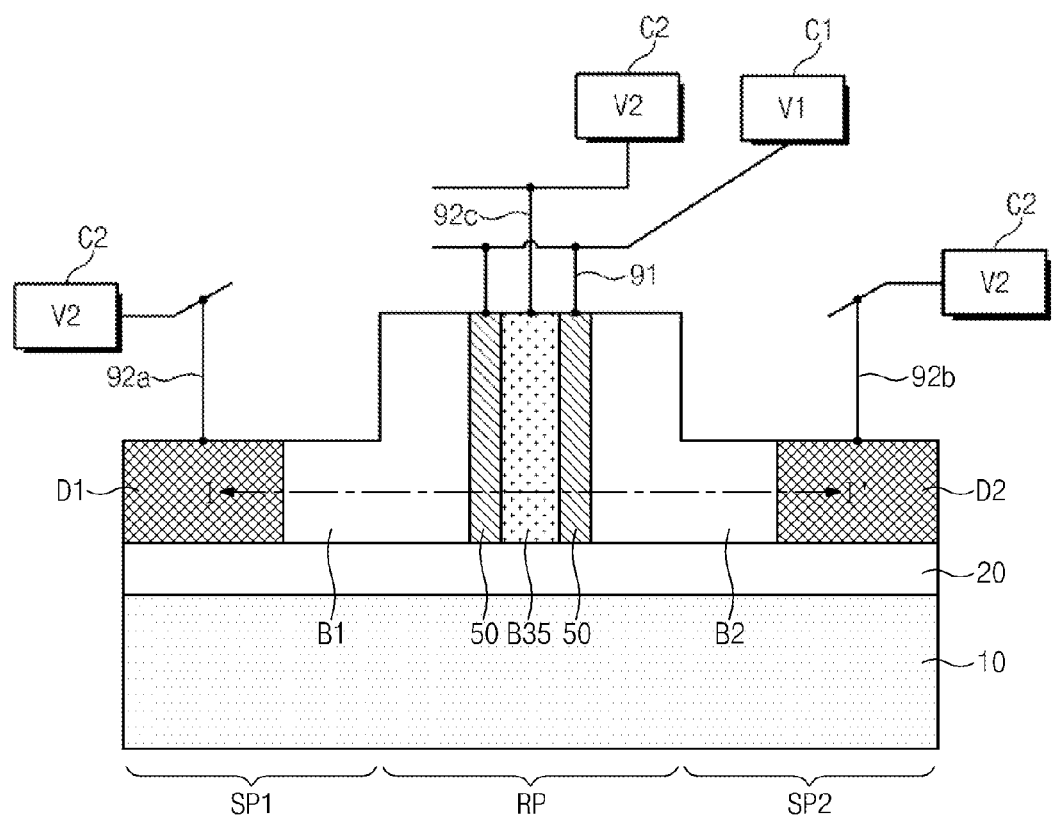
FIGS. 6A and 6B are cross-sectional diagrams electro-optic modulating devices according to a fourth modified embodiment of the present invention.
Figure 6B:
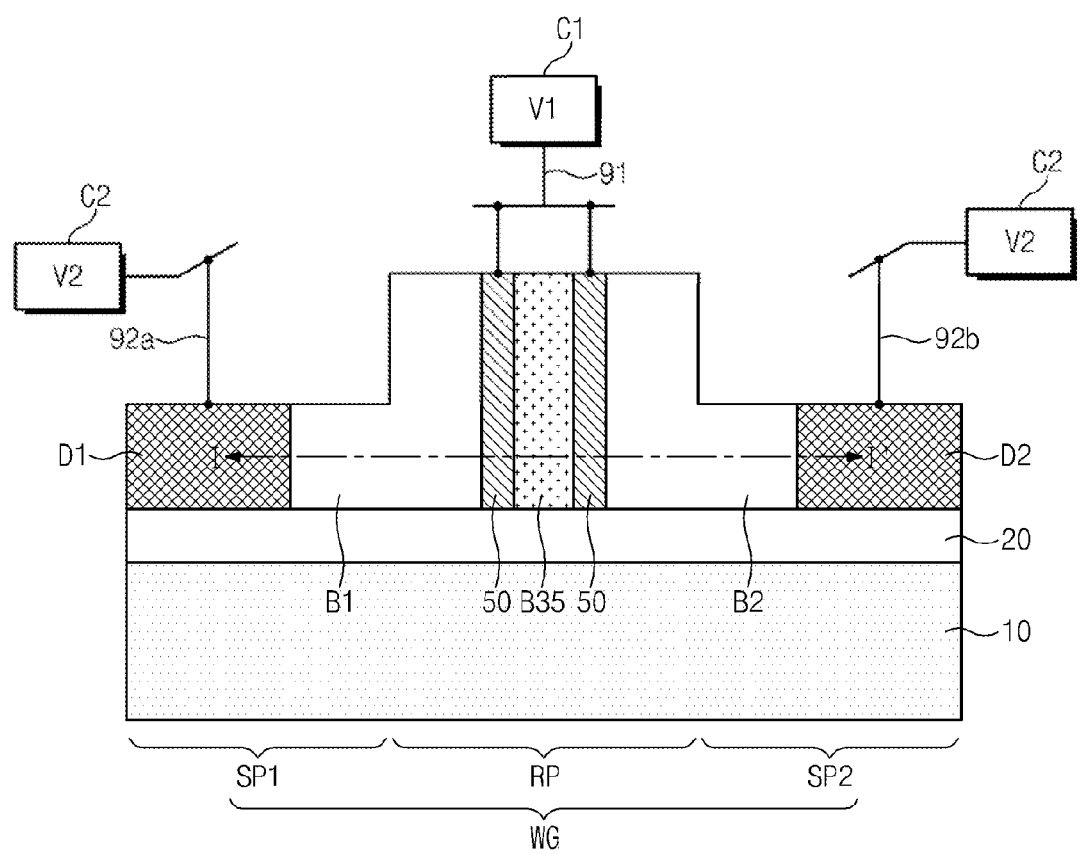
Figure 6C:
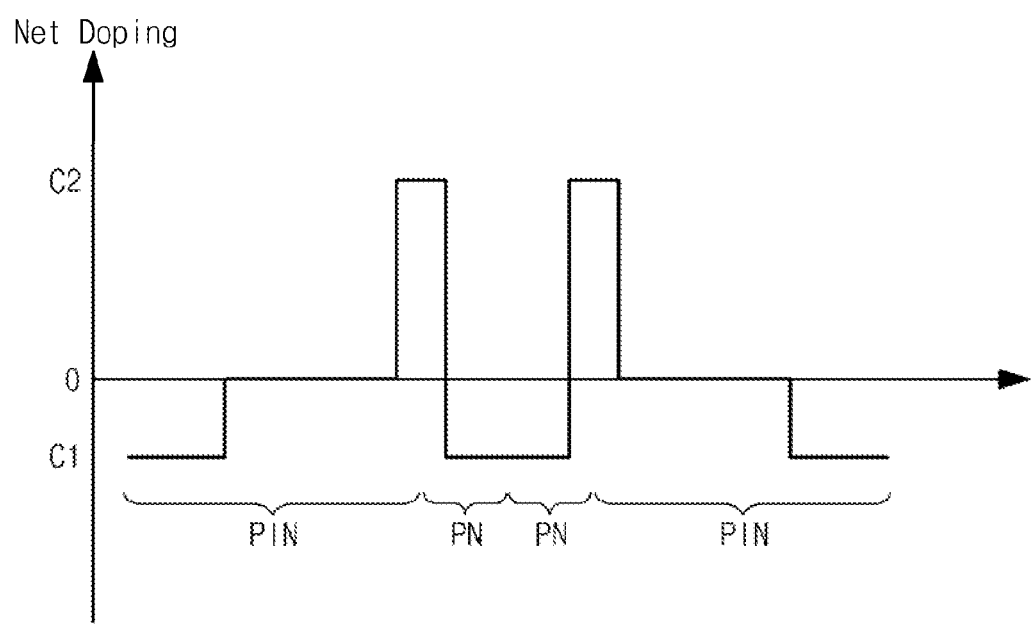
FIG. 6C is a diagram illustrating a net doping profile of an electro-optic modulating device according to a fourth modified embodiment of the present invention.

FIGS. 6A and 6B are cross-sectional diagrams electro-optic modulating devices according to a fourth modified embodiment of the present invention. FIG. 6C is a diagram illustrating a net doping profile of an electro-optic modulating device according to a fourth modified embodiment of the present invention. Specifically, FIG. 6C is a graph illustrating a net doping profile along the dotted lines I-I' of FIGS. 6A and 6B. For simplicity of explanation, description of technical features identical to those of the embodiments described with reference to FIGS. 4A and 4B will be omitted herein.

Referring to FIGS. 6A and 6B, a vertical structure including two vertical doping regions 50 and an internal doping region B35 disposed between the two vertical doping regions 50 may be disposed in the rib portion RP.

The internal doping region B35 may have the same conductive type as the first and second doping regions D1 and D2. That is, the internal doping region B35 may have a conductive type different from the vertical doping regions 50, and therefore a pair of PN-junctions may be formed in the vertical structure as shown in FIG. 6C. As a result, the optical waveguide WG may include two PIN-junctions and two PN-junctions.

According to an embodiment, as shown in FIG. 6A, the vertical doping regions 50 may be electrically connected to the first circuit C1 generating a first voltage V1 through a first interconnection structure 91, and the internal doping region B35 may be electrically connected to a second circuit C2 generating a second voltage V2 through an internal interconnection structure 92c. According to the present embodiment, a forward direct current voltage may be applied between the vertical doping regions 50 and the first and second doping regions D1 and D2, and therefore the PIN-junctions may operate in PIN forward mode. Also, a reverse direct current voltage may be applied between the vertical doping regions 50 and the internal doping region B35, and therefore the PN-junctions may operate in PN reverse mode. As a result, the electro-optic modulating device according to the present embodiment may have a hybrid structure that takes two effects causing a variation of the refractive index. One effect is a variation of the refractive index according to a current injection effect of two PIN-junctions operating in PIN forward mode, and the other effect is a variation of the refractive index according to a change of the depletion layer in two PN-junctions operating in PN reverse mode.

According to another embodiment, as shown in FIG. 6B, the vertical doping regions 50 may be electrically connected to a first circuit C1 generating a first voltage V1 through a first interconnection structure 91, and the internal doping region B35 may be in a state where the internal doping region B35 is not connected to an external circuit. According to the present embodiment, a forward direct current voltage may be applied between the vertical doping regions 50 and the first and second doping regions D1 and D2, and therefore the PIN-junctions may operate in PIN forward mode. However, the internal doping region B35 may be electrically in a floating state.

Fifth Modified Embodiment

Figure 7A:
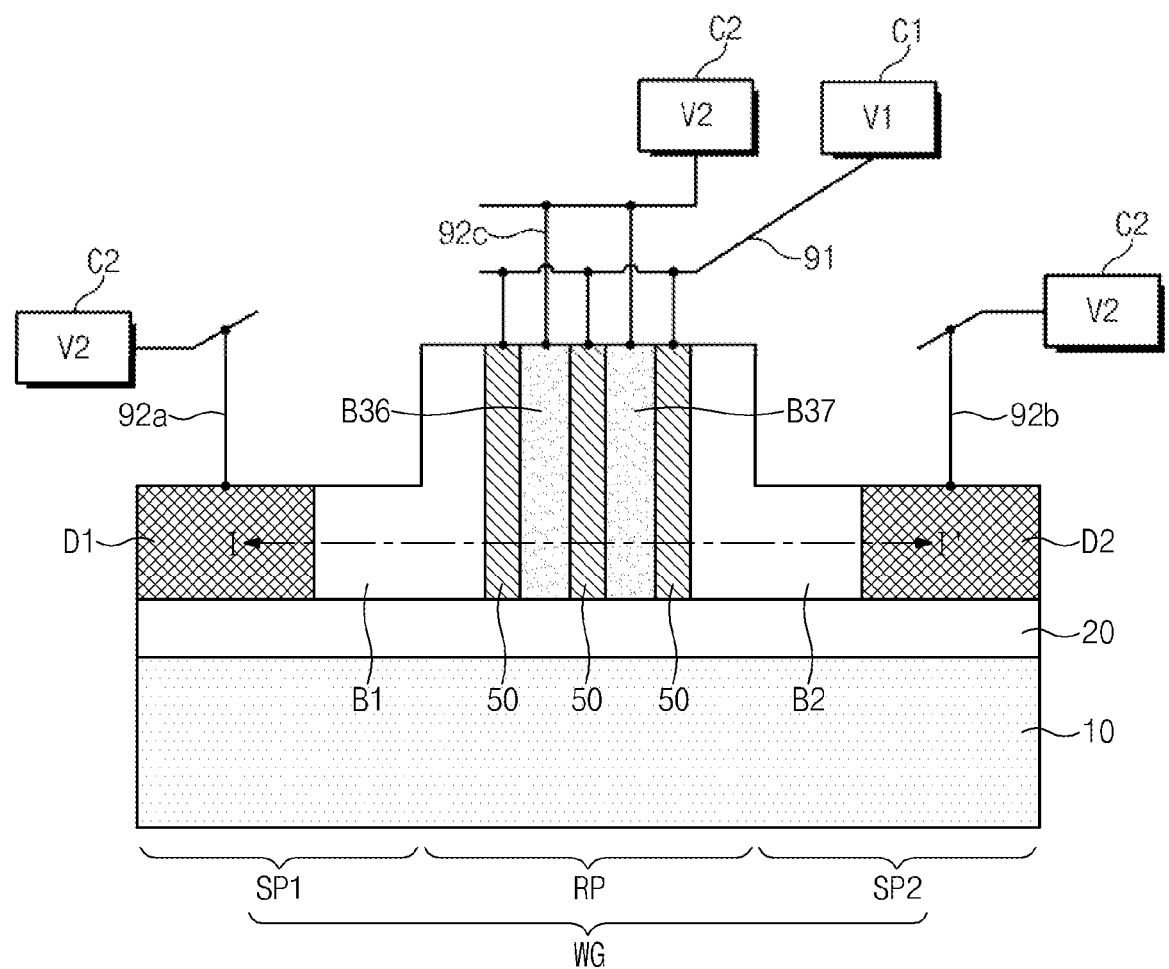
FIG. 7A is a cross-sectional view illustrating electro-optic modulating devices according to a fifth modified embodiment of the present invention.
Figure 7B:
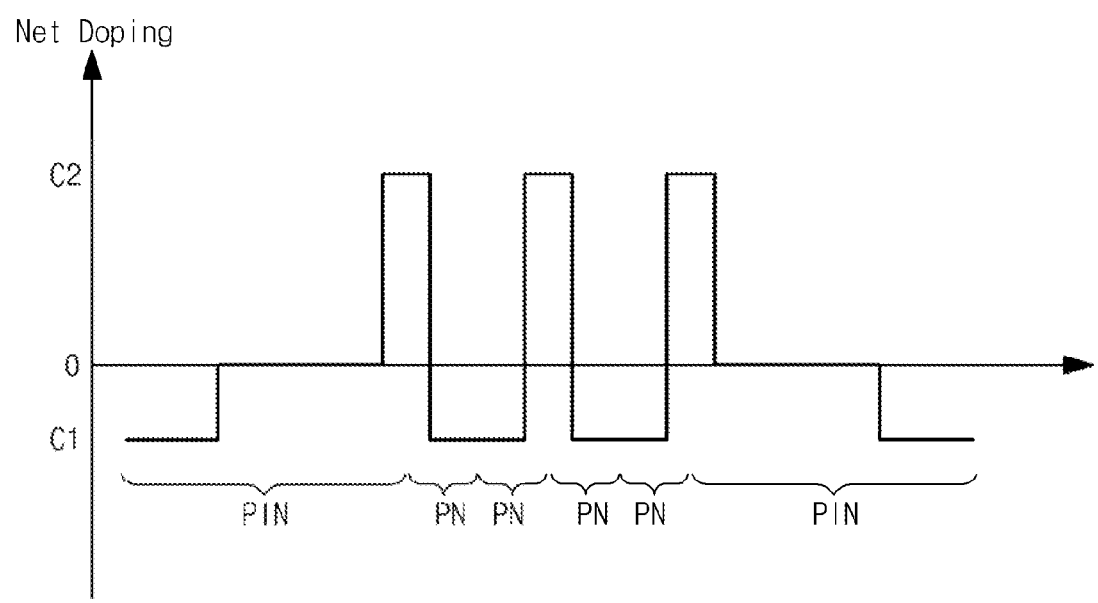
FIG. 7B is a graph illustrating a net doping profile of an electro-optic modulating device according to a fifth modified embodiment of the present invention.

FIG. 7A is a cross-sectional view illustrating electro-optic modulating devices according to a fifth modified embodiment of the present invention. FIG. 7B is a graph illustrating a net doping profile of an electro-optic modulating device according to a fifth modified embodiment of the present invention. Specifically, FIG. 7B is a graph illustrating a net doping profile along the dotted line I-I' of FIG. 7A. For simplicity of explanation, description of technical features identical to those of the embodiments described with reference to the previous drawings will be omitted herein.

Referring to FIG. 7A, a vertical structure including three vertical doping regions 50 and a pair of internal doping regions B36 and B37 disposed among the three vertical doping regions 50 may be disposed in the rib portion RP.

The internal doping regions B36 and B37 may have the same conductive type as the first and second doping regions D1 and D2. That is, the internal doping regions B36 and B37 may have a conductive type different from the vertical doping regions 50, and therefore four PN-junctions may be formed in the vertical structure as shown in FIG. 7B. As a result, the optical waveguide WG may include two PIN-junctions implemented using the first second body regions B1 and 132 and four PN-junctions implemented in the vertical structure.

As shown in FIG. 7A, the vertical doping regions 50 may be electrically connected to the first circuit C1 generating a first voltage V1 through a first interconnection structure 91, and the internal doping regions B36 and B37 may be electrically connected to a second circuit C2 generating a second voltage V2 through an internal interconnection structure 92c. According to the present embodiment, a forward direct current voltage may be applied between the vertical doping regions 50 and the first and second doping regions D1 and D2, and therefore the PIN-junctions may operate in PIN forward mode. Also, a reverse direct current voltage may be applied between the vertical doping regions 50 and the internal doping regions B36 and 837, and therefore the PN-junctions may operate in PN reverse mode. As a result, the electro-optic modulating device according to the present embodiment may have a hybrid structure described with reference to FIG. 6A. That is, the electro-optic modulating device according to the present embodiment may simultaneously implement a variation of the refractive index according to a current injection effect of two PIN-junctions operating in PIN forward mode, and a variation of the refractive index according to a change of the depletion layer in four PN-junctions operating in PN reverse mode.

Sixth Modified Embodiment

Figure 8A:
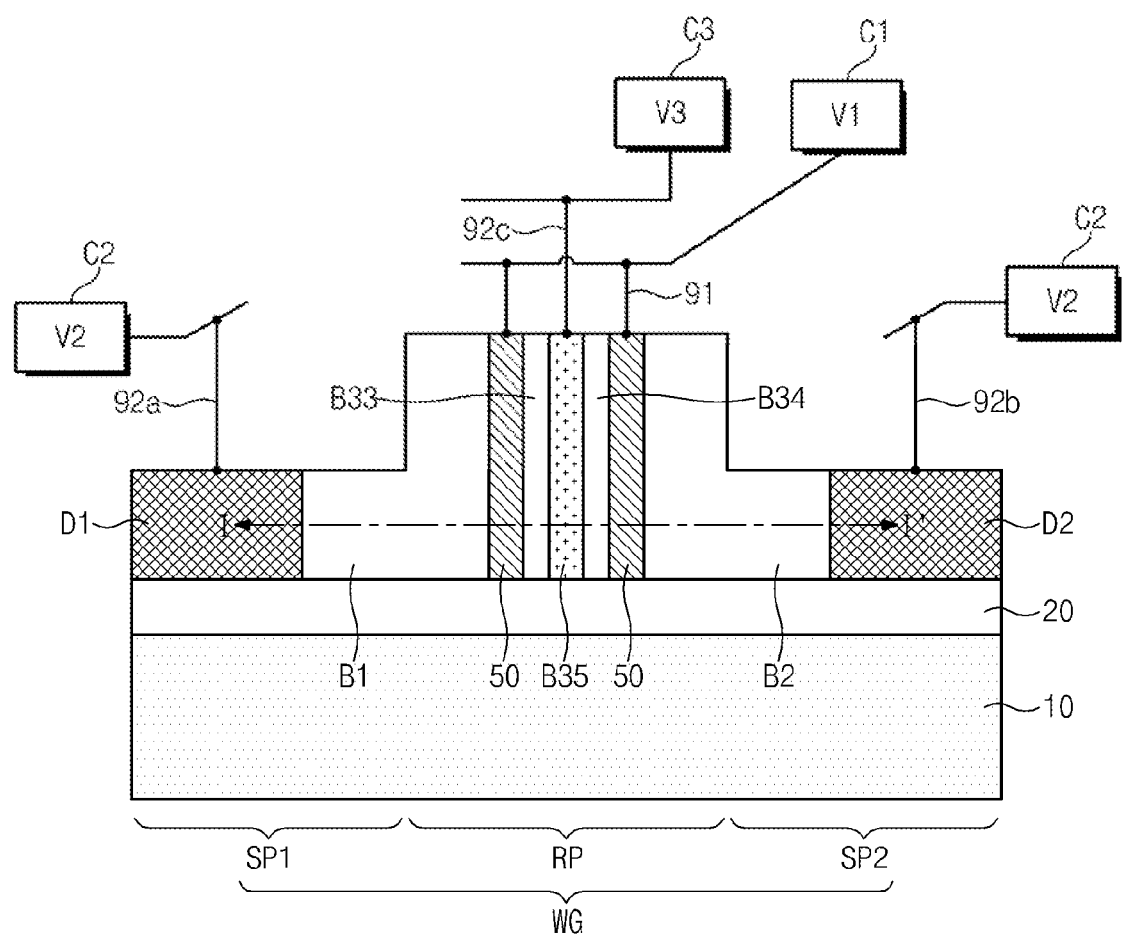
FIGS. 8A through 8C are cross-sectional diagrams illustrating electro-optic modulating devices according to a sixth modified embodiment of the present invention.
Figure 8B:
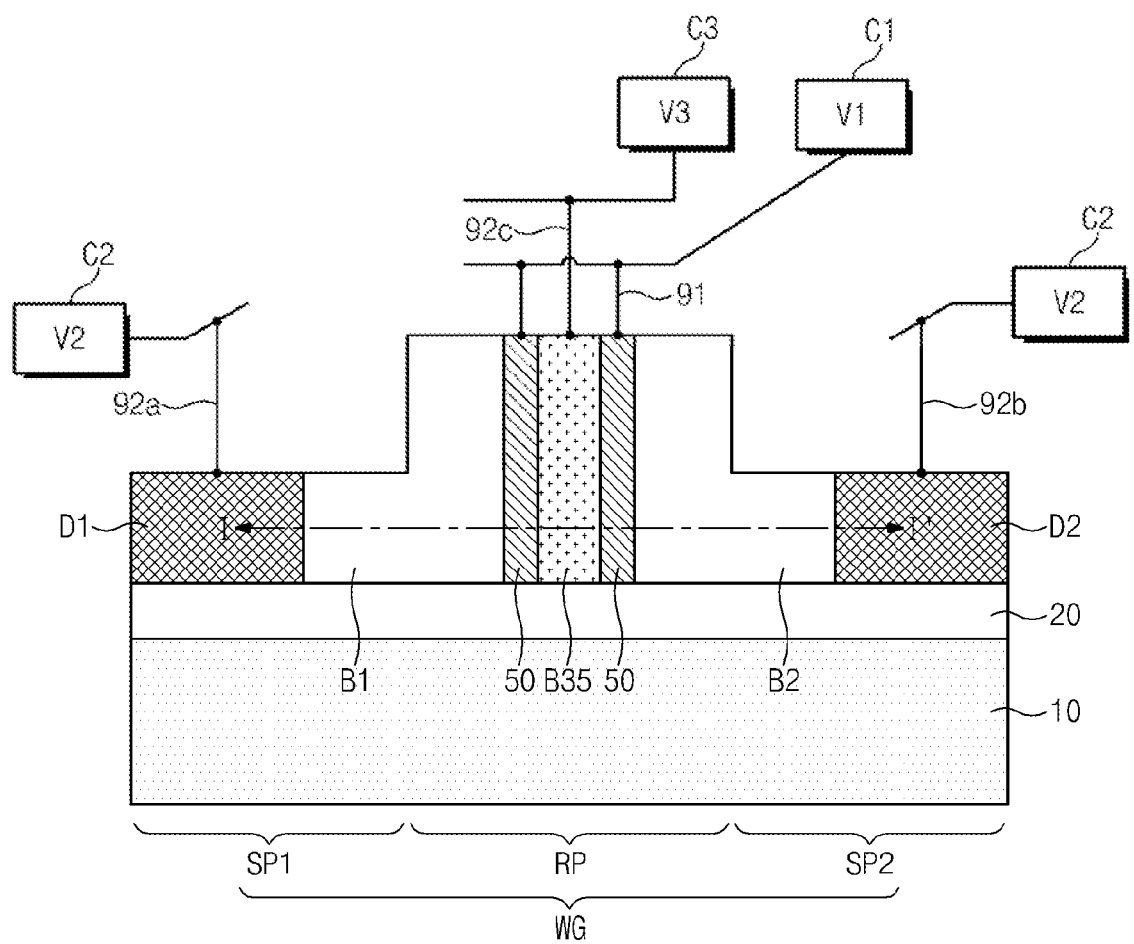
Figure 8C:
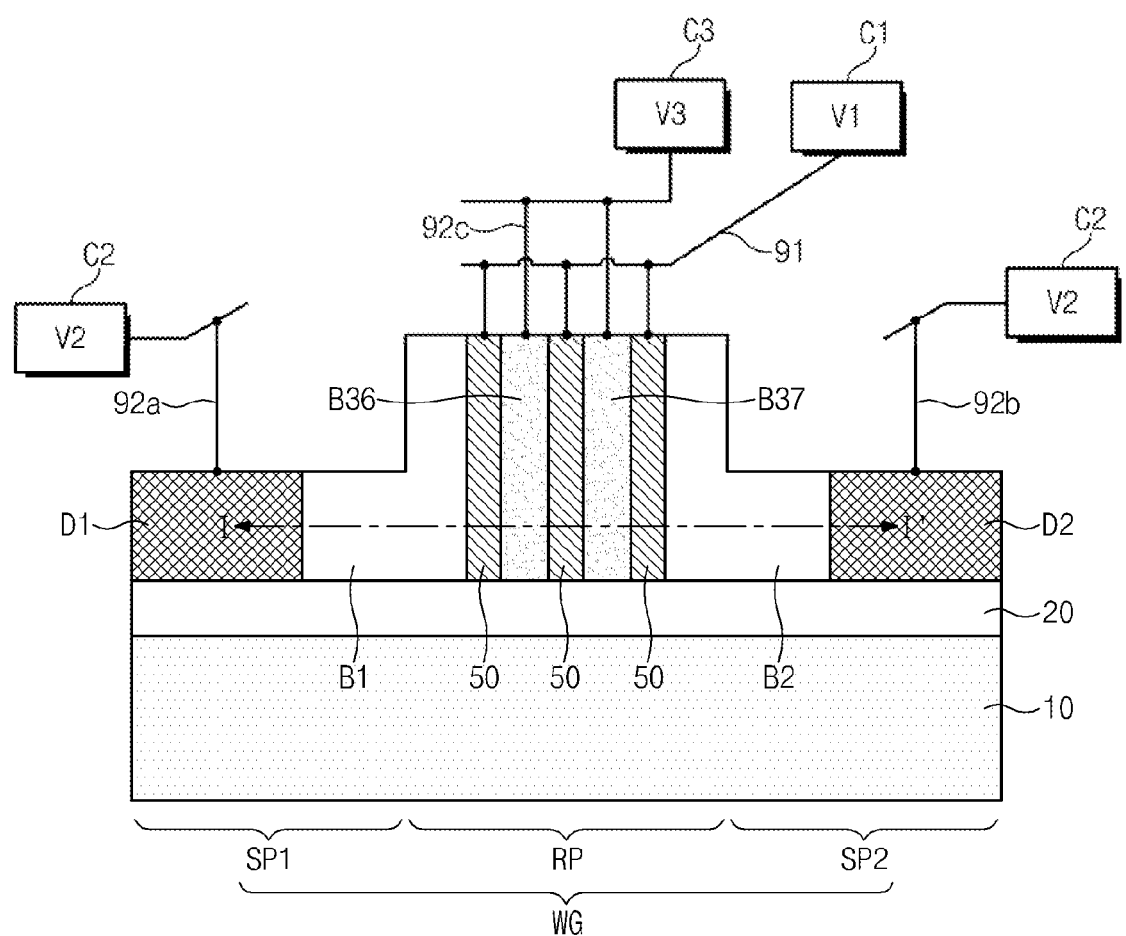

FIGS. 8A through 8C are cross-sectional diagrams illustrating electro-optic modulating devices according to a sixth modified embodiment of the present invention. FIGS. 8A through 8C illustrate embodiments modified from the embodiments described with reference to FIGS. 5A, 6A, and 7A. For simplicity of explanation, description of technical features identical to those of the embodiments described with reference to the previous drawings will be omitted herein.

Referring to FIGS. 8A through 8C, the internal doping regions (B35 of FIGS. 8A and 8B, and B36 and B37 of FIG. 8C) in the vertical structure may be connected to a third circuit C3 generating a third voltage V3. In this case, the third voltage V3 may be different from the second voltage V2 that is applied to the first and second doping region D1 and D2. Thus, the PIN-junctions of FIG. 8A formed in the vertical structure or the PN junctions of FIGS. 8B and 8C may operate independently of PIN-junctions formed outside the vertical structure.

Specifically, according to an embodiment, a forward direct current voltage may be applied between the vertical doping regions 50 and the first and second doping regions D1 and D2, and therefore the PIN-junctions formed outside the vertical structure may operate in PIN forward mode. However, an electric potential difference applied between the vertical doping regions 50 and the internal doping regions B36 and B37 may be determined by the third voltage V3, the junctions in the vertical structure may operate under optimized conditions regardless of the operation of the PIN-junctions outside the vertical structure. As a result, the junctions inside and outside the vertical structure may operate independently of each other under optimized conditions. This independent optimization may be used to improve modulation characteristics in an electro-optic modulating device according to an embodiment.

Third Embodiment

Figure 9A:
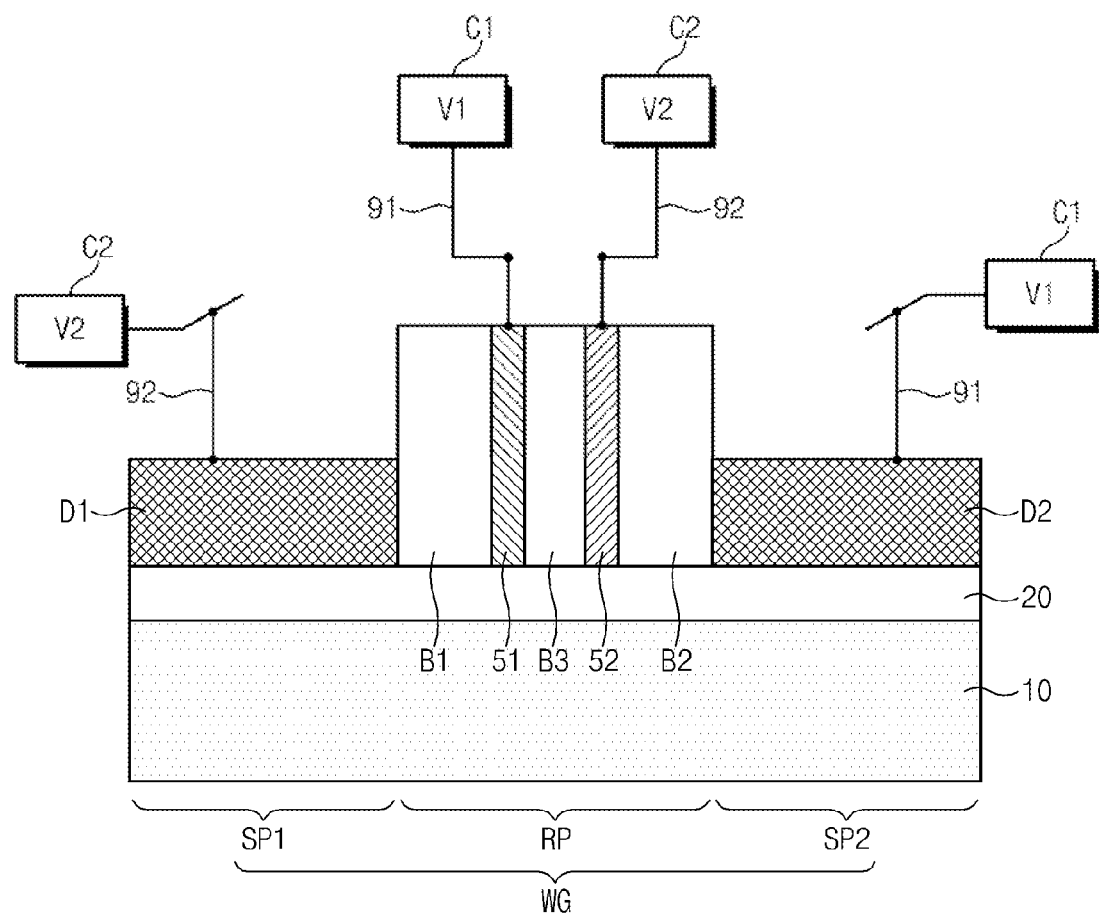
FIGS. 9A and 9B are cross-sectional diagrams illustrating electro-optic modulating devices according to a third embodiment of the present invention.
Figure 9B:
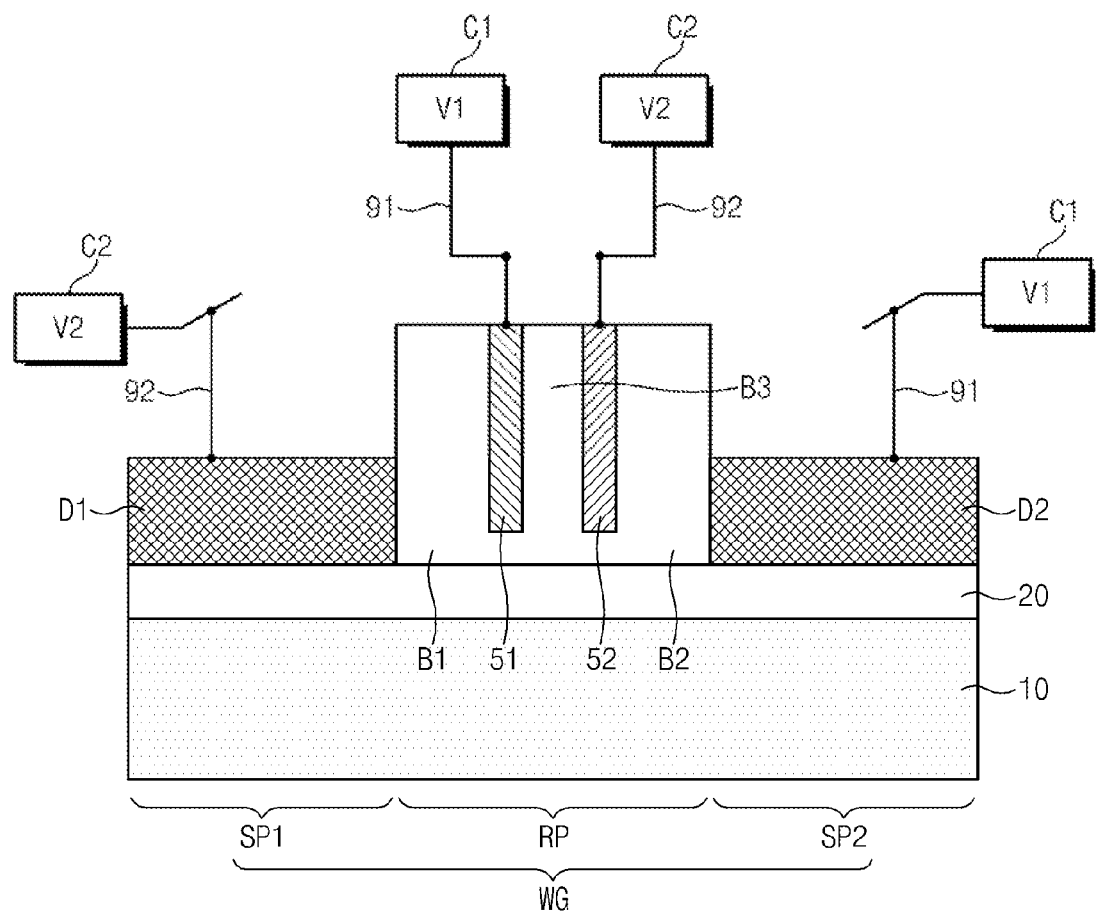

FIGS. 9A and 9B are cross-sectional diagrams illustrating electro-optic modulating devices according to a third embodiment of the present invention. For simplicity of explanation, description of technical features identical to those of the embodiments described with reference to the previous drawings will be omitted herein.

Referring to FIGS. 9A and 9B, a semiconductor layer 30 forming an optical waveguide WG may be disposed on a substrate 10. The optical waveguide WG may include a first slab portion SP1, a second slab portion SP2, and a rib portion RP disposed therebetween.

First and second doping regions D1 and D2 may be disposed in the first and second slab portions SP1 and SP2, and a vertical structure may be disposed in the rib portion RP. According to an embodiment, the first doping region D1 and the second doping region D2 may have different conductive types from each other. For example, the first doping region D1 is a p-type, and the second doping region D2 may be an n-type. Thus, the first and second slab portions SP1 and SP2 may be asymmetric at the side of a doping profile around the rib portion RP.

The vertical structure may include a first vertical doping region 51 and a second vertical doping region 52 that are spaced from each other, and an internal region B3 disposed therebetween. The first vertical doping region 51 and the second vertical doping region 52 may have different conductive types from each other, and the internal region B3 may be an intrinsic semiconductor. Thus, the first vertical doping region 51 and the second vertical doping region 52, and the internal region B3, which are disposed in the vertical structure, may form a PIN-junction.

In addition, the first vertical doping region 51 may have a different conductive type from the first doping region D1, and may be disposed adjacent to the first doping region D1. The second vertical doping region 52 may have a different conductive type from the second doping region D2, and may be disposed adjacent to the second doping region D2. A first body region B1 disposed between the first vertical doping region 51 and the first doping region. D1, and a second body region B2 disposed between the second vertical doping region 52 and the second doping region D2 may be intrinsic semiconductors. In this case, the first vertical doping region 51, the first body region B1, and the first doping region D1 may form a PIN-junction, and the second vertical doping region 52, the second body region B2, and the second doping region D2 may form another PIN-junction.

The first and second vertical doping regions 51 and 52 may be extended to a depth less than the thickness of the rib portion RP as shown in FIG. 9B, and may be extended to the upper surface of a buried insulating layer 20.

The first vertical doping region 51 and the second doping region D2 may be electrically connected to a first circuit C1 generating a first voltage V1 through a first interconnection structure 91, and the second vertical doping region 52 and the first doping region D1 may be electrically connected to a second circuit C2 generating a second voltage V2 through a second interconnection structure 92. According to an embodiment, the first voltage V1 and the second voltage V2 may be a modulation voltage and a ground voltage, respectively. Also, the first and second circuits C1 and C2 may generate the first and second voltages V1 and V2 such that the PIN-junctions may operate in PIN forward mode.

Fourth Embodiment

Figure 10A:
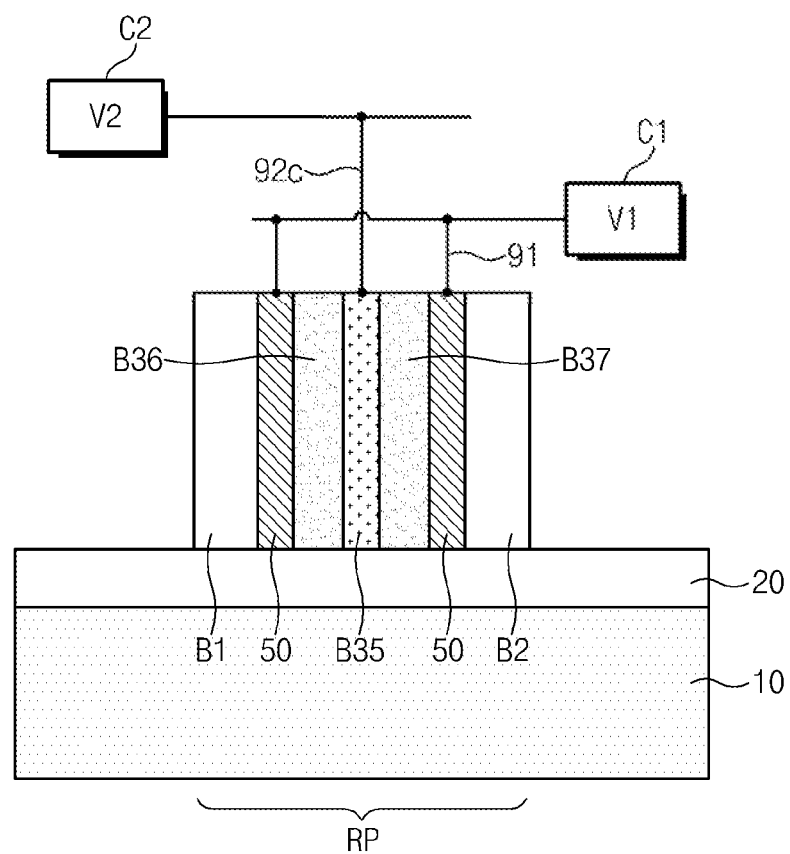
FIGS. 10A and 10B are cross-sectional diagrams illustrating electro-optic modulating devices according to a fourth embodiment of the present invention.
Figure 10B:
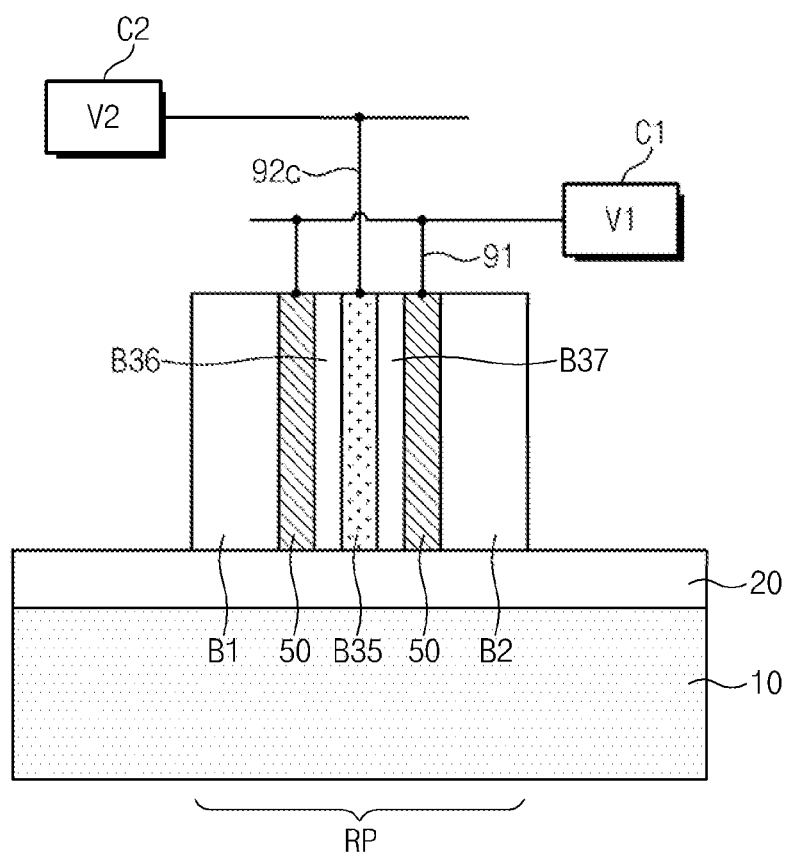

FIGS. 10A and 10B are cross-sectional diagrams illustrating electro-optic modulating devices according to a fourth embodiment of the present invention. For simplicity of explanation, description of technical features identical to those of the embodiments described with reference to the previous drawings will be omitted herein.

Referring to FIGS. 10A and 10B, a semiconductor layer 30 forming an optical waveguide WG may be disposed on a substrate 10. The optical waveguide WG may be disposed to have sidewalls exposing the upper surface of a buried insulating layer 20. That is, according to the present embodiment, the optical waveguide WG may be disposed to have a channel waveguide structure.

A vertical structure having at least one pair of vertical doping regions 50 may be disposed in the optical waveguide WG. The vertical structure may further include an internal doping region B35 disposed between the vertical doping regions 50 and at least two internal regions B36 and B37 disposed between the internal doping region B35 and the vertical doping regions 50. The internal doping region B35 may have a different type from the vertical doping regions 50. The internal regions B36 and B37 may be doped with certain impurities as shown in FIG. 10A, or may be intrinsic semiconductors as shown in FIG. 10B.

When the internal region B36 and B37 are doped, as shown in FIG. 10A, the internal regions B36 and B37 may have impurity concentrations less than that of the internal doping region B35, and may have the same conductive type as the internal doping region B35. According to the present embodiment, the internal regions B36 and B37 and the vertical doping regions 50 may form a pair of PN-junctions. According to a modified embodiment, the internal regions B36 and B37 may have impurity concentrations less than that of the vertical doping region 50, and may have the same conductive type as the vertical doping region 50. Similarly, according to the modified embodiment, the internal regions B36 and B37 and the internal doping region B35 may form a pair of PN-junctions.

When the internal regions B36 and B37 are intrinsic semiconductors, as shown in FIG. 10B, the vertical doping region 50, the internal regions B36 and B37, the internal doping region B35 may form a pair of PIN-junctions.

The vertical doping regions 50 may be electrically connected to a first circuit C1 generating a first voltage V1 through a first interconnection structure 91, and the internal doping region B35 may be electrically connected to a second circuit C2 generating a second voltage V2 through a second interconnection structure 92. The first voltage V1 and the second voltage V2 may be a modulation voltage and a ground voltage, respectively. In the embodiment described with reference to FIG. 10A, the first and second circuits C1 and C2 may generate the first and second voltages V1 and V2 such that the PN junctions may operate in PN reverse mode. In the embodiment described with reference to FIG. 10B, the first and second circuits C1 and C2 may generate the first and second voltages V1 and V2 such that the PIN-junctions may operate in PIN forward mode.

Figure 11:
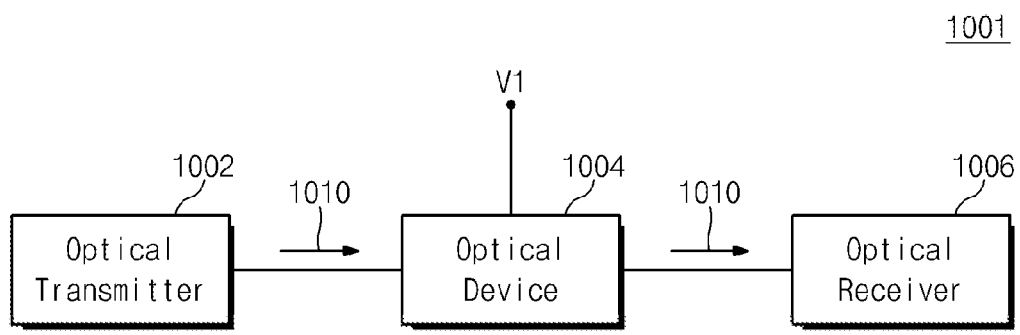
FIG. 11 is a block diagram illustrating an optical system including an optical transmitter and an optical receiver according to embodiments of the present invention.

FIG. 11 is a block diagram illustrating an optical system including an optical transmitter and an optical receiver according to embodiments of the present invention.

Referring to FIG. 11, an optical system 1001 may include at least one optical transmitter 1002 and at least one optical receiver 1006. The optical system 1001 may include an optical device 1004 that is optically connected between the optical transmitter 1002 and the optical receiver 1006. The optical transmitter 1002 may be configured to transmit optical beam 1010 received from the optical device 1004. The optical device 1004 may be configured to modulate one of the optical characteristics of the optical beam 1010 in response to the modulating signal V1. For example, the optical device 1004 may include one of the electro-optic modulating devices described with reference to FIGS. 1 through 10. According to an embodiment, the optical device 1004 may be configured to function as an optical delay. According to another embodiment, the optical device 1004 may be used to implement an optical amplitude modulator.

Figure 12:
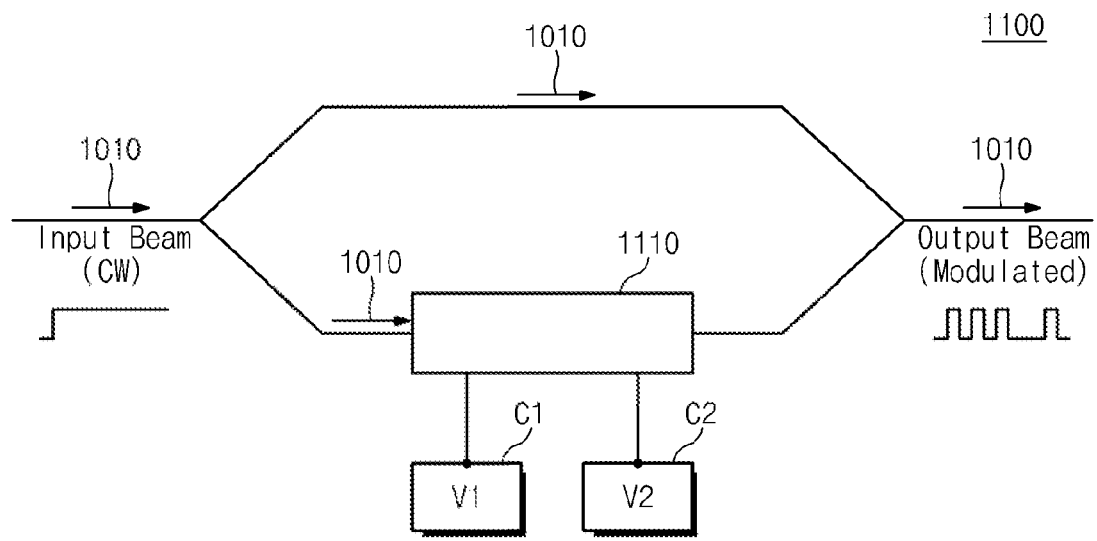
FIG. 12 is a diagram illustrating an optical modulator that can be employed as optical devices of FIG. 11 according to an embodiment of the present invention.

FIG. 12 is a diagram illustrating an optical modulator 1100 that can be employed as the optical device 1004 of FIG. 11 according to an embodiment of the present invention.

Referring to FIG. 12, the optical modulator 1100 may include an optical phase shifter 1110 disposed in one of two arms that are optically combined between two cascaded Y-brand couplers of a Mach-Zehnder Interferometer (MZI) configuration. According to an embodiment, the optical phase shifter 1110 may be formed to have a structure identical or similar to one of the electro-optic modulating devices described with reference to FIGS. 1 through 10.

In operation, the optical beam 1010 may be separated from the first cascaded Y-branch coupler after being incident to the input of the MZI. As a result, a first portion of the optical beam 1010 may travel to one of the arms of the MZI, and a second portion of the optical beam 1010 may travel to the other arm of the MZI.

As shown in the drawing, the optical phase shifter 1110 may be formed in one of the arms of the MZI, and may control a relative phase difference between the first and second portions of the optical beam 1010 in response to external signals V1 and V2. The first and second portions of the optical beam 1010 may be joined together at the output of the MZI. As a result of constructive interference and destructive interference between the first and second portions of the optical beam 1010 by the relative phase difference, the optical beam 1010 emitted from the output of the MZI may have modulated characteristics. According to an embodiment, the optical beam 1010 incident to the input of the MZI may be a continuous wave, and the optical beam 1010 emitted from the output of the MZI may have a saw-tooth waveform as a result of the modulation. According to a modified embodiment of the present invention, both of the two arms of the MZI may be configured to have the electro-optic modulating devices disclosed in the present invention.

In the meantime, the optical device 1004 may be implemented with various methods other than MZI. For example, the optical device 1004 may also be implemented through a ring-resonator structure including a structure identical or similar to one of the electro-optic modulating devices described with reference to FIGS. 1 through 10.

According to an embodiment of the present invention, the optical waveguides described with reference to FIGS. 1 through 10 may be implemented with SOI wafers. According to another embodiment of the present invention, the optical waveguides described with reference to FIGS. 1 through 10 may be implemented with SOI wafers formed by implanting ions into a certain region of a silicon wafer. According to an embodiment, the ions may include oxygen atoms, and may be locally implanted into a certain location where the optical waveguide is to be formed.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An electro-optic modulating device comprising an optical waveguide on a substrate where a vertical structure with at least two sidewalls and a bottom wall is disposed,
   wherein the two sidewalls are used to configure two vertical junctions extending vertically with respect to an upper surface of the substrate and the bottom wall is used to configure a parallel junction extending parallel to the upper surface of the substrate, and wherein the optical waveguide comprises a slab waveguide structure comprising a first slab portion, a second slab portion electrically connected to the first slab portion, and a rib portion disposed between the first slab portion and the second slab portion, and the vertical structure is disposed in the rib portion.

2. The electro-optic modulating device of claim 1, wherein the optical waveguide comprises:

a body region extended from the first slab portion to contact at least two sidewalls and the bottom wall of the vertical structure and extended to the second slab portion, wherein the body region has a first conductive type, and the vertical structure comprises at least one vertical doping region having a second conductive type different from the first conductive type.

3. The electro-optic modulating device of claim 2, wherein the body region, and the vertical structure form a a PN-junctions.

4. The electro-optic modulating device of claim 3, further comprising:

a first interconnection structure electrically connecting the vertical doping region and a first circuit; and a second interconnection structure electrically connecting each slab portion and a second circuit, wherein the first and the second circuits are configured to generate an electric potential difference for a reverse-bias operation of the PN junctions.

5. The electro-optic modulating device of claim 1, wherein the optical waveguide comprises:

a body region extended from the first slab portion to contact the at least two sidewalls and the bottom wall of the vertical structure and extended to the second slab portion, wherein the first slab portion comprises a first doping region of a first conductive type, the second slab portion comprises a second doping region of the first conductive type, the body region is formed of an intrinsic semiconductor, the vertical structure comprises at least one vertical doping region of a second conductive type different from the first conductive type, and the first and second doping regions, the body region, and the vertical doping region form PIN junctions.

6. An electro-optic modulating device comprising:

an optical waveguide including a first slab portion, a second slab portion, and a rib portion disposed between the first and second slab portion, wherein the rib portion comprises a vertical structure forming at least two PIN-junctions, wherein the first and second slab portions comprise first and second doping regions of a first conductive type, and the optical waveguide comprises a first body region disposed between the first slab portion and the vertical structure and a second body region disposed between the second slab portion and the vertical structure, wherein the first and second body regions are formed of intrinsic semiconductors, and the vertical structure comprises at least one vertical doping region having a second conductive type different from the first conductive type.

7. The electro-optic modulating device of claim 6, further comprising:

a first interconnection structure electrically connecting the vertical structure and a first circuit; and a second interconnection structure electrically connecting the first and second slab portions and a second circuit, wherein the first and second circuits are configured to generate an electric potential difference for a forward-bias operation of the PIN junctions.

8. An electro-optic modulating device including an optical waveguide comprising:

a vertical structure with at least two sidewalls wherein the sidewalls are used to configure a junction;

a slab waveguide structure including a first slab portion, a second slab portion, and a rib portion disposed between the first slab portion and the second slab portion, wherein the first slab portion comprises a first doping region of a first conductive type, the second slab portion comprises a second doping region of the first conductive type, and the vertical structure is disposed in the rib portion;

a first body region extended from the first doping region to contact a first sidewall of the vertical structure; and a second body region extended from the second doping region to contact a second sidewall of the vertical structure, wherein the first and second body regions are formed of intrinsic semiconductors, and the vertical structure comprises at least one vertical doping region having a second conductive type different from the first conductive type.

9. The electro-optic modulating device of claim 8, wherein the first doping region, the first body region and the vertical structure form a PIN junction, and the second doping region, the second body region and the vertical structure form a PIN junction.

10. The electro-optic modulating device of claim 9, further comprising:

a first interconnection structure electrically connecting the vertical doping region and a first circuit; and a second interconnection structure electrically connecting each slab portion and a second circuit, wherein the first and second circuits are configured to generate an electric potential difference for a forward-bias operation of the PIN junctions.

11. The electro-optic modulating device of claim 8, wherein thicknesses of the first and second doping regions are substantially the same as thicknesses of the first and second slab portions, respectively.

* * * * *